(12) United States Patent
Stjernholm et al.

(10) Patent No.: US 12,457,574 B2
(45) Date of Patent: Oct. 28, 2025

(54) INDIVIDUAL USER EQUIPMENT MANAGEMENT IN RAN

(71) Applicant: Telefonaktiebolaget LM Ericsson (PUBL), Stockholm (SE)

(72) Inventors: Paul Stjernholm, Lidingö (SE); John Power, Athlone (IE); Mathias Sintorn, Sollentuna (SE); Göran Eriksson, Norrtälje (SE); Patric Lind, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 378 days.

(21) Appl. No.: 17/914,937

(22) PCT Filed: Mar. 31, 2021

(86) PCT No.: PCT/IB2021/052691
§ 371 (c)(1),
(2) Date: Sep. 27, 2022

(87) PCT Pub. No.: WO2021/198947
PCT Pub. Date: Oct. 7, 2021

(65) Prior Publication Data
US 2023/0337170 A1    Oct. 19, 2023

Related U.S. Application Data

(60) Provisional application No. 63/003,605, filed on Apr. 1, 2020.

(51) Int. Cl.
*H04W 60/06* (2009.01)
(52) U.S. Cl.
CPC .................. *H04W 60/06* (2013.01)

(58) Field of Classification Search
CPC ....... H04W 60/06; H04W 8/18; H04W 24/02; H04W 88/18
USPC ........................................................ 455/435.1
See application file for complete search history.

(56) References Cited

U.S. PATENT DOCUMENTS

| | | |
|---|---|---|
| 2015/0043353 A1 | 2/2015 | Javed |
| 2015/0078173 A1 | 3/2015 | Javed |
| 2016/0330612 A1* | 11/2016 | Mildh .................. H04W 8/24 |
| 2018/0227842 A1* | 8/2018 | Chandramouli .... H04W 12/065 |
| 2019/0007500 A1 | 1/2019 | Kim et al. |
| 2019/0124561 A1* | 4/2019 | Faccin .................. H04W 48/18 |

(Continued)

FOREIGN PATENT DOCUMENTS

| | | |
|---|---|---|
| EP | 1 427 225 A2 | 6/2004 |
| WO | 2021 010693 A1 | 1/2021 |

OTHER PUBLICATIONS

PCT International Search Report issued for International application No. PCT/IB2021/052691—Aug. 19, 2021.

(Continued)

*Primary Examiner* — Syed Haider
(74) *Attorney, Agent, or Firm* — Baker Botts L.L.P.

(57) ABSTRACT

According to some embodiments, a method performed by a network management system for managing one or more radio access networks (RANs) comprises receiving an indication from a RAN that a RAN identifier has been assigned for a wireless device, associating a management system identifier for the wireless device with the RAN identifier for the wireless device; and storing the association in a wireless device registry.

22 Claims, 22 Drawing Sheets

900

912 – receive an indication from a RAN that a RAN identifier has been assigned for a wireless device 914 – associate a management system identifier for the wireless device with the RAN identifier for the wireless device 916 – associate a SUPI for the wireless device with the management system identifier for the wireless device 918 – associate a GUTI for the wireless device with the management system identifier for the wireless device 920 – storing the association in a wireless device registry To Fig. 9B

(56) References Cited

U.S. PATENT DOCUMENTS

2019/0313359 A1* 10/2019 Lee ................. H04W 76/14
2019/0394746 A1* 12/2019 Edge ................ H04W 76/30
2020/0084636 A1   3/2020 Zhang et al.
2022/0053355 A1*  2/2022 Stjernholm .......... H04W 48/08

OTHER PUBLICATIONS

PCT Written Opinion of the International Searching Authority issued for International application No. PCT/IB2021/052691—Aug. 19, 2021.
Notice of Reasons for Rejection issued for Japanese Patent No. 2022-559337—Aug. 30, 2023.

* cited by examiner

900

922 – receive an indication from a RAN that a RAN identifier has been reassigned for a wireless device 924 – updating the association of the management system identifier for the wireless device with the reassigned RAN identifier for the wireless device 926 – receive an indication from the RAN that a RAN identifier has been de-assigned for a wireless device 928 – remove an association of a management system identifier for the wireless device with the de-assigned RAN identifier for the wireless device from the registry 930 – determine to perform an operation for the wireless device towards the RAN 932 – correlate the network management identifier associated with the wireless device with the RAN identifier for the wireless device based on the registry 934 – transmit a message towards the RAN that includes the RAN identifier for the wireless device From Fig. 9A

Fig. 9B

INDIVIDUAL USER EQUIPMENT MANAGEMENT IN RAN

PRIORITY

This nonprovisional application is a U.S. National Stage Filing under 35 U.S.C. § 371 of International Patent Application Serial No. PCT/IB2021/052691 filed Mar. 31, 2021 and entitled "Individual User Equipment Management in RAN" which claims priority to U.S. Provisional Patent Application No. 63/003,605 filed Apr. 1, 2020 both of which are hereby incorporated by reference in their entirety.

TECHNICAL FIELD

Particular embodiments relate to wireless communication, and more specifically to managing individual user equipment (UE) in the radio access network (RAN) via a network management system.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The Third Generation Partnership Project (3GPP) radio access network (RAN) is managed over an operations and management (O&M) interface specified by the SA5 working group. For long term evolution (LTE), the interface is denoted Itf-N and specified in the 28-series documents.

The current management interfaces use an information model, referred to as the network resource model (NRM) in 3GPP, to convey the configuration of the network. In vendor realizations, it is possible to configure the treatment of user equipment (UE) adhering to some classification defined by, e.g., subscriber profile identity (SPID) and quality of service (QoS) channel indicator (QCI). The SPID and QCI is provided to the RAN from the core network over the 3GPP standardized control plane interfaces.

The Open Network Automation Platform (ONAP) automates network management using measurement data (received from the network or other sources) to dynamically decide how to reconfigure the network to obtain certain objectives. The network may be the RAN and the objectives may concern the treatment of UEs in the RAN.

There currently exist certain challenges with managing individual UEs in the RAN. For example, as described above, vendor realization of the standard facilitates configuration of UE treatment per UE group, defined by, e.g., SPID and QCI. However, there is no possibility to address an individual UE and dynamically change the RAN treatment of the individual UE. Both SPID and QCI have a limited configuration range and it is not practical or feasible to address individual UEs using the legacy concepts.

SUMMARY

As described above, certain challenges currently exist with managing individual user equipment (UEs) in the radio access network (RAN). Certain aspects of the present disclosure and their embodiments may provide solutions to these or other challenges.

For example, particular embodiments described herein include management capabilities facilitating dynamically controlling the treatment of individual UEs in the RAN. Some embodiments include a new interface between the RAN and the management system, where the management system may be based on the Open Network Automation Platform (ONAP) and/or Open RAN (ORAN) architecture/open source code. Particular embodiments include interaction between the management system and the core to facilitate dynamically controlling the treatment of individual UEs. In general, a management system including service management and orchestration (SMO) and Non-RT RAN intelligent controller (RIC) functionality may identify and observe individual UEs reported from RAN functions.

According to some embodiments, a method performed by a network management system for managing one or more RANs comprises receiving an indication from a RAN that a RAN identifier has been assigned for a wireless device, associating a management system identifier for the wireless device with the RAN identifier for the wireless device, and storing the association in a wireless device registry.

In particular embodiments, the method further comprises associating a subscription permanent identifier (SUPI) for the wireless device and/or a global unique temporary identifier (GUTI) for the wireless device with the management system identifier for the wireless device.

In particular embodiments, the method further comprises receiving an indication that a RAN identifier has been reassigned for a wireless device and updating the association of the management system identifier for the wireless device with the reassigned RAN identifier for the wireless device.

In particular embodiments, the method further comprises receiving an indication from the RAN that a RAN identifier has been de-assigned for a wireless device and removing an association of a management system identifier for the wireless device with the de-assigned RAN identifier for the wireless device from the registry.

In particular embodiments, the method further comprises determining to perform an operation for the wireless device towards the RAN, correlating the network management identifier associated with the wireless device with the RAN identifier for the wireless device based on the registry; and transmitting a message towards the RAN that includes the RAN identifier for the wireless device.

In particular embodiments, the method further comprises requesting an identifier correlation from an identifier correlation (IDC) service. The IDC service may comprise a SUPI to GUTI correlation service.

According to some embodiments, a network management system comprises processing circuitry operable to perform any of the network management system methods described above.

According to some embodiments, a method performed by an access and mobility management function (AMF) comprises receiving an indication that a service to expose a SUPI to GUTI correlation service for one or more subscribers is active, maintaining a correlation of SUPI and GUTI for the one or more subscribers; and transmitting a correlation of SUPI and GUTI for at least one of the one or more subscribers towards a network management system.

In particular embodiments, the method further comprises receiving an indication from a network registration function (NRF) to provide the SUPI to GUTI correlation service.

In particular embodiments, transmitting the correlation of SUPI and GUTI for at least one of the one or more subscribers comprises transmitting the correlation to a network registration function (NRF).

According to some embodiments, an AMF comprises processing circuitry operable to perform any of the AMF methods described above.

Also disclosed is a computer program product comprising a non-transitory computer readable medium storing computer readable program code, the computer readable program code operable, when executed by processing circuitry to perform any of the methods performed by the network management system described above.

Another computer program product comprises a non-transitory computer readable medium storing computer readable program code, the computer readable program code operable, when executed by processing circuitry to perform any of the methods performed by the AMF described above.

Certain embodiments may provide one or more of the following technical advantages. For example, some embodiments facilitate a management system to identify, observe and/or issue policies for individual UEs in the RAN.

BRIEF DESCRIPTION OF THE DRAWINGS

For a more complete understanding of the disclosed embodiments and their features and advantages, reference is now made to the following description, taken in conjunction with the accompanying drawings, in which:

FIGS. 9A and 9B are flowchart illustrating an example method in a network management system, according to certain embodiments.

DETAILED DESCRIPTION

As described above, certain challenges currently exist with managing individual user equipment (UEs) in the radio access network (RAN). Certain aspects of the present disclosure and their embodiments may provide solutions to these or other challenges.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In particular embodiments, the management layer (e.g., Service Management and Orchestration (SMO)) identifies and follows individual UEs in the RAN. Some embodiments may address the UE using identifiers to convey information guiding how the UE should be treated by the RAN.

Some embodiments include an inventory of UE IDs held in the SMO functionality in a telecom management system, henceforth denoted MgmS.

In the MgmS and the non-RT RAN intelligent controller (RIC), per-UE optimization operations may be performed based on an internal UE identifier such as the RAN Mgmt UE ID.

In a management function referred to as the UE Registry, the RAN Mgmt UE ID may be mapped to the following identifiers: subscription permanent identifier (SUPI), global unique temporary identifier GUTI, and RAN UE ID.

A RAN Mgmt UE ID has a 1-to-1 relation with a SUPI and is assigned when information about a UE, related to a SUPI not currently present in the UE Registry, is to be added. An example is illustrated in FIG. 1.

Figure 1:
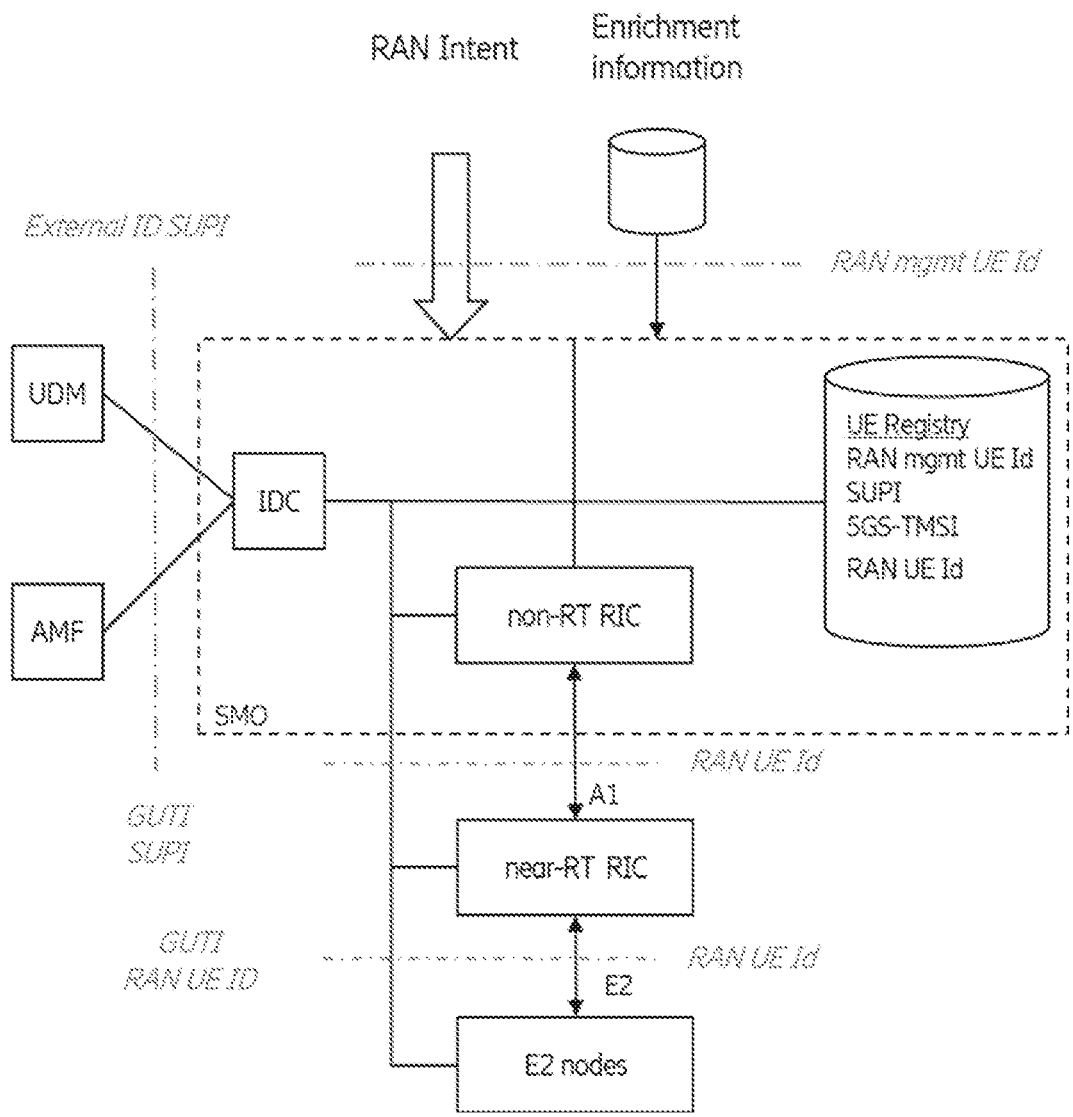
FIG. 1 is a block diagram illustrating an example network management system, according to particular embodiments.

FIG. 1 is a block diagram illustrating an example network management system, according to particular embodiments. When a UE goes ACTIVE in the RAN (i.e., leaves RRC-IDLE), a RAN UE ID is assigned by the central unit control plane (CU-CP) and used by the RAN nodes and the near-RT RIC. The near-RT RIC and the management system (e.g., SMO) is informed when the RAN UE ID is: (a) assigned (when UE leaves IDLE); (b) re-assigned (due to timer or time to live (TTL) expiry); and (c) de-assigned (when UE enters IDLE).

The near-RT RIC is informed about RAN UE ID in an E2 message. The management system is informed about RAN UE ID, GUTI and the assignment reason in an O1 message.

The management system also includes the UE Registry. When the management system receives information related to a RAN UE ID, it correlates it to the RAN Mgmt UE ID (RM UE ID) using the RAN Mgmt UE Registry. When another management system function or the non-RT RIC needs to perform a per-UE operation towards the RAN, it correlates the RM UE ID to a RAN UE ID using the UE Registry.

When the management system receives information containing a GUTI that is not in the UE Registry, it uses an ID Correlation (IDC) service to correlate the CAM to a SUPI. If there is a RM UE ID related to the SUPI, the UE Registry is updated. If there is no RM UE ID related to the SUPI, a new RM UE ID is assigned and an entry is created in the management system UE Registry.

When the management system is informed about a RAN UE ID, it uses the GUTI or the old RAN UE ID to update the UE Registry for the related RM UE ID.

Figure 2:
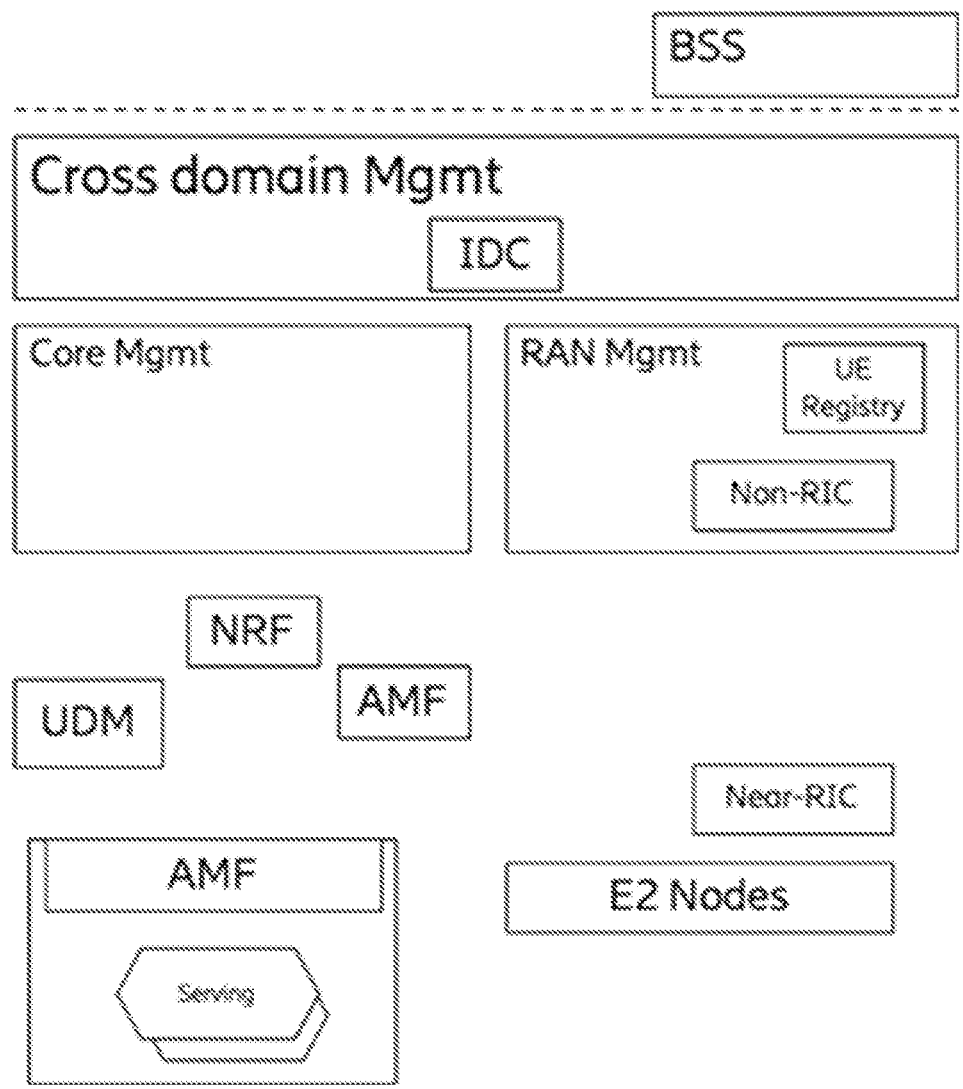
FIG. 2 is a block diagram illustrating an example ID correlation (IDC) service, according to particular embodiments.

FIG. 2 is a block diagram illustrating an example ID correlation (IDC) service, according to particular embodiments. For example, the IDC may provide a SUPI to OUT correlation service.

In some embodiments, a management system, part of which includes SMO and non-RT RIC functionality, sometimes referred to as an operation support system (OSS), with entities for managing core and RAN domains respectively and with entities for managing cross domain, end-to-end, aspects. In some embodiments, the IDC is a function of the cross-domain management.

Some embodiments include a cloud native access and mobility management function (AMF) uS (microservice) serving active UE's, serving UE services such as mobility and session management, "Serving uMS". The "serving uMS" handles GUTI life cycle and has the mapping of SUPI to GUTI. A "serving AMF uS" may persist GUTI to SUPI correlation in a local database.

Some embodiments obtain the GUTI to SUPI mapping according to the following principles. An AMF software instance, having the SUPI to GUTI mapping, "Serving uS", is instructed to expose this information in a service endpoint.

The triggering of the AMF instance to expose the information may be done in two steps: 1) using the same mechanisms as triggering Trace operations in AMF, i.e. UE context flag is set in message from the unified data management (UDM) function, the UE Context including the flag is following the UE at handover; and 2) by the AMF providing the correlation information to a consumer or a core network (CN) network function (NF) acting as a broker towards the management system, such as the network repository function (NRF).

The core network NRF acts as 'service broker' for the information, meaning management system consumers use its service interface to discover the AMF IDC service and subscribe to the GUTI to SUPI correlation, the NRF managing obtaining the information from the AMFs involved in handling the UE and aggregates the information towards the management system consumer(s), e.g. and IDC.

The NRF may request the UDM to trigger AMF service and in the request include the information service AMFs should use to contact the serving NRF, "NRF contact information" One example of such information is a uniform resource identifier (URI) pointing to the NRF for the serving AMF to contact, "NRF contact URI".

As a UE attaches, the UDM sets a flag in UE Context indicating to AMF the service to expose SUPI to GUTI is active. UDM also includes the NRF contact information. The AMF contacts the NRF according to "NRF contact information".

If the deployment uses AMF Regions, the management system may use AMF Identifier information, such as the Region the AMF belongs to, to secure a unique GUTI to SUPI mapping. An example procedure following the principles outlined above is illustrated in FIG. 3.

Figure 3:
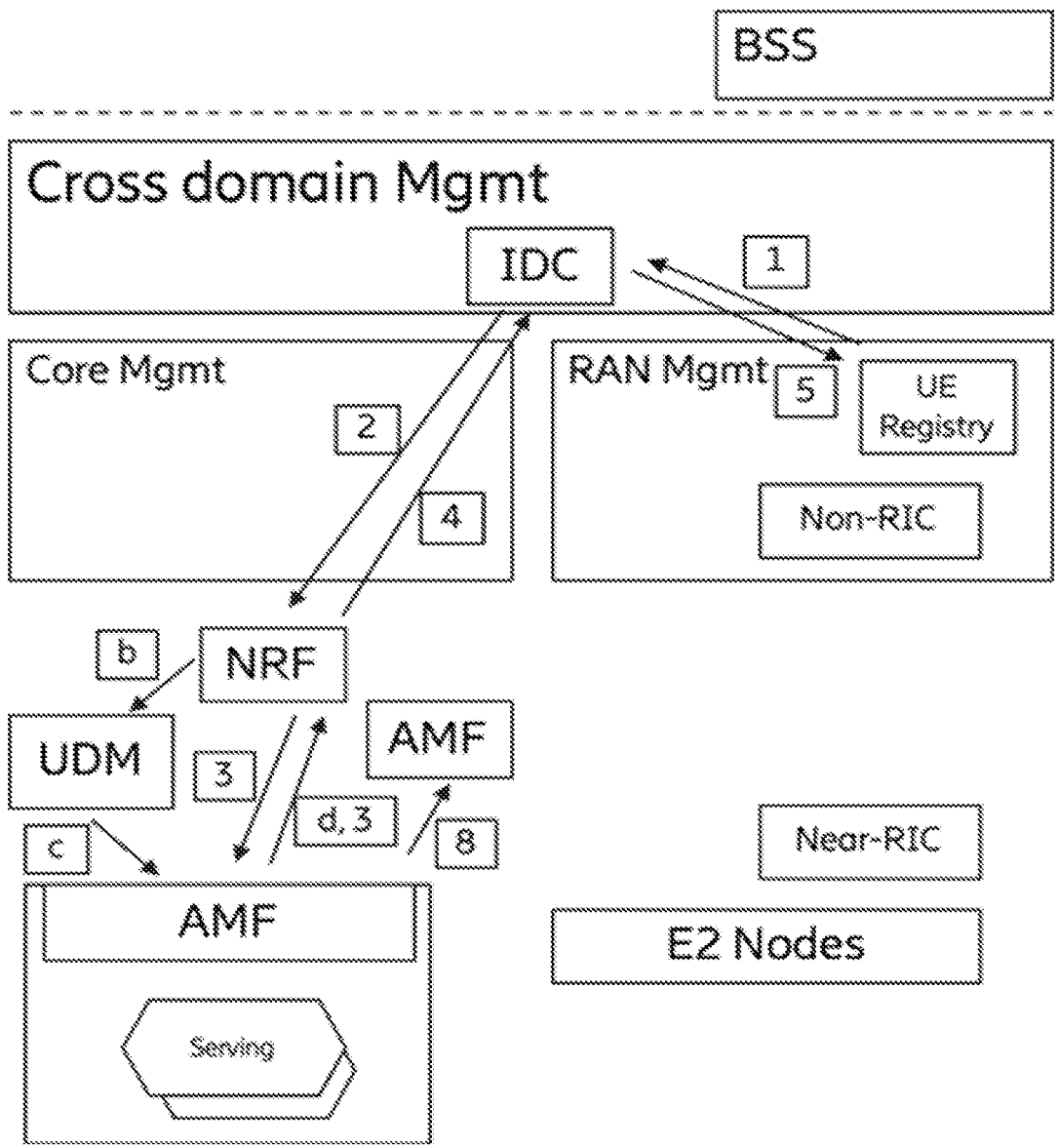
FIG. 3 is a flow diagram illustrating an example IDC service, according to particular embodiments.

FIG. 3 is a flow diagram illustrating an example IDC service, according to particular embodiments. The service providing mapping of GUTI to SUPI may be referred to as Core_Amf_IdC."

Some embodiments include configuring producers and publishing service in the NRF. For example, the Core_Amf_IdC service may enabled by the management system provisioning the capabilities in core NF's. In UDM, set flag in UE Context for Core_Amf_IdC to 'enabled' for all or a subset of subscribers. In NRF, enable capability for Core_Amf_IdC service. The NRF requests the UDM to trigger AMF service and in the request includes information service AMF uses to contact. "NRF contact information". One example of such information is a URI pointing to NRF for serving AMF to contact. "NRF contact URI." This is illustrated in step b of FIG. 3.

As a UE attaches, the UDM responds to AMF request with flag in UE Context indicating to AMF the service to expose SUPI to GUTI is active. UDM also includes the NRF contact information, as illustrated in step c of FIG. 3.

The AMF, serving uMS, receives the information from the UDM and contacts the NRF, indicating readiness to provide information, as illustrated in step d of FIG. 3.

The NRF publishes the Core__Amf__Idc service making it available for service discovery by consumers in management system.

Some embodiments include consumption of the IDC service. For example, the RAN UE Registry within the Non-RT RIC may request IDC for GUTI mapping to SUPI, as illustrated in step 1 of FIG. 3. The AMF Region may be appended as metadata to the request.

The Cross Mgmt IDC discovers and subscribes to Core_Amf_IdC service provided by the NRF, as illustrated in step 2, for the SUPI related to the GUTI of the UE for which identity correlation is required. The NRF requires the AMF instance to start providing needed updates on SUPI to GUTI mapping.

The AMF, e.g. the currently Serving uMS, sends a message to the NRF with the current GUTI to SUPI mapping and previous n GUTI used, where n can be configured and/or set in request.

The NRF forwards the information to consumer(s), e.g. the Cross domain IDC, as illustrated in step 4.

If AMF Regions are used, the IDC may use topology information to resolve to which AMF Region the AMF belongs and appends this to the response to RAN UE Registry, as illustrated in step 5.

The RAN UE Registry compares the [set of] GUTI received from IDC to GUTI received via O1. If the GUI from O1 does not match any of the GUTI from IDC, then IDC correlation service is considered broken and proper fault management actions are triggered. If there is a match, the UE Registry is updated with the mapping of SUPI to GUTI and associated SMO UE identity.

If AMF Regions are used, the UE Registry may also use topology information to tag GUTI received via O1 and compares this with AMF Region metadata received from IDC to have unique SUPI to GUTI mapping.

The delivery of the information from the AMF may also be done directly to IDC, bypassing NRF, and even SMO UE Registry, henceforth referred to as direct delivery.

If a Signaling MDT Trace is active for the UE for which the AMF is asked to expose GUTI to SUPI correlation, the AMF instance also includes information available to identify the trace, such as id, time, etc. in the message to NRF and onwards to IDC and UE registry. This enables management system entities, such as the Non-RT RIC to combine O1 observations with other data made available in minimization of drive test (MDT), such as performance measurements done in the core network user plane function (UPF).

Although FIGS. 1-3 illustrate the UE Registry as a separate block from the non-RT RIC and in some embodiments may comprise a separate network node, in other embodiments the non-RT RIC may include the UE Registry. In general, although illustrated as separate blocks, any of the network management functions may exist together or separately in any combination.

Some embodiments include RAN operations. For example, per-UE based RAN optimizations in the non-RT RIC may be based on per-UE observables received over O1 and per-UE policies issued over A1.

Observables may include the following examples. In one example, the management system requests measurement jobs (e.g. PM UE traces and Managed MDT) over O1 based on the RAN UE ID related to the RAN Mgmt UE ID for the UE to be observed. The RAN labels the trace events with the RAN UE ID and the management system correlates the events to the RAN Mgmt UE ID when received.

If the RAN UE ID is re-assigned, the trace session remains active and the trace events are labelled with the new RAN UE ID. Because the management system UE Registry has been updated with the new RAN UE ID, the management system continues to correlate the received events to the Mgmt UE ID.

Policies may include the following examples. In one example, based on RAN intents, e.g. goals related to connectivity service performance in a certain area, time period and set of UE's, observability and enrichment information, the non-RT RIC can formulate A1 policies to optimize the experience and realisation of the delivery thereof, for one or more UE internally identified by a RAN Mgmt UE ID. A1 policies are created based on the RAN UE ID related to the RAN Mgmt UE ID for the UE to be optimized. The near-RT RIC uses the A1 policy to steer the RAN based on the RAN UE ID and can provide policy feedback related to the enforcement status of a created policy based on the Policy Id.

If the RAN UE ID is re-assigned, the A1 policy remains enforced but RAN actions are now based on the new RAN UE ID. A1 policy management and feedback is based on the Policy Id assigned when creating the policy. If the A1 policy needs to be updated, it contains the new RAN UE ID. Non-RT RIC can re-evaluate and update the A1 policy if needed, based on observables and possibly triggered by the RAN UE ID re-assignment.

In case the RAN UE ID is de-assigned (UE goes to IDLE), the non-RT RIC can delete an A1 policy for the RAN UE ID because it no longer can be enforced in the RAN, or it can keep it and update it with a new RAN UE ID when the UE becomes ACTIVE again.

If an A1 policy is created for a RAN UE ID that is not yet available (i.e., a source CU-CP has assigned it and a target CU-CP is to prepare for optimization in case of a handover) it can be kept un-enforced until RAN UE ID is assigned (i.e., transferred in a handover request message).

An A1 policy cannot be created (not even to prepare for optimization), and no observables received, for a UE that is IDLE because no RAN UE ID is assigned and the RAN does not keep GUTI or SUPI.

Some embodiments include external information. For example, the management system may receive directives and information related to users that are expressed using some external identifiers that needs to be translated to the UE identifiers used in the management system and in the RAN. The ID Correlation service may be used, in combination with the management system UE Registry, to: (a) translate an external identifier to a SUPI, and then via SMO UE ID to a RAN UE ID; and/or (b) translate a RAN UE ID, via RAN Mgmt UE ID and SUPI, to an external identifier.

FIGS. 4A-4D are a sequence diagram illustrating RAN UE ID assignment and optional correlation with external UE ID and SUPI, according to some embodiments. The 5G core network includes a UDM, a NRF, and an AMF. The Management System includes an IDC, a non-RT RIC, and a Collection function (e.g., storage). The O-RAN includes a near-RT RIC and a CU-CP.

The UE starts out in the idle state and no RAN UE ID is assigned. Steps 1-7 illustrate optional steps of querying a SUPI based on an external UE ID. At step 1, the non-RT RIC receives a request involving an external UE ID. At step 2, the non-RT-RIC makes a SUPI request to the IDC. The request includes the external UE ID. At step 3, the IDC forwards the request to the NRF. At step 4, the NRF forwards the request to the UDM. The UDM looks up the SUPI based on the external UE ID and returns the SUPI to the NRF at step 5. At step 6, the NRF forwards the SUPI to the IDC, which is then forwarded to the non-RT RIC at step 7. The non-RT RIC stores the associated external UE ID and SUPI in the UE Registry.

Steps 8-10 illustrate optional steps of setting up a SUPI correlation. At step 8, the non-RT RIC sends the IDC a command to correlate the SUPI in one or more AMFs. At step 9, the IDC forwards the command to the NRF. At step 10, the UDM receives the command and sets the IDC flag to enabled for the SUPI.

Steps 11-22 illustrates a UE transitioning from IDLE to ACTIVE. At step 11, the UE sends an RRC Connection Setup message to the CU-CP. The 5G-S-TMSI is assigned. At step 12, the CLI-CP sends the initial UE message with the 5G-S-TMSI to the AMF over the N2 interface. The AMF responds to the CU-CP at step 13 with the initial UE Context Request that includes a GUAMI. At step 14, the CU-CP derives the GUTI for the UE.

At step 15, the UDM sends a Get SDM "Retrieve ID flag" to the AMF. If the IDC flag is enabled the AMF, at step 16, sends a correlate GUTI and SUPI message to the NRF. At step 17, the NRF sends a correlate GUTI and SUPI message to the IDC.

At step 18, the CU-CP assigns a new RAN UE ID for the UE. At step 19, the CU-CP sends a UE Context Setup message to the near-RT RIC that includes the RAN UE ID. The CU-CP also sends an A1 UEID update message to the Collection function of the network management system over the O1 interface. The message includes an indication that the GUTI and RAN UE ID are assigned to each other. The Collection function sends the indication that the GUTI and RAN UE ID are assigned to the non-RT RIC at step 21.

If no RM UE ID is associated to the GUTI in the UE Registry, then the non-RT RIC creates a new RM UE ID. Otherwise, the non-RT RIC associates the GUTI with an existing RM UE ID in the UE Registry.

If SUPI is not in the UE Registry and correlation to SUPI is required, then at step 22 the non-RT RIC contacts the IDC to get the SUPI based on the GUTI and associates the SUP with the RM UE ID in the UE Registry.

At this point the UE is active, the RAN UE ID is assigned, and the RM UE ID and optionally SUPI and external UE ID are associated with the GUTI and RAN UE ID in the UE Registry.

Figure 5A:
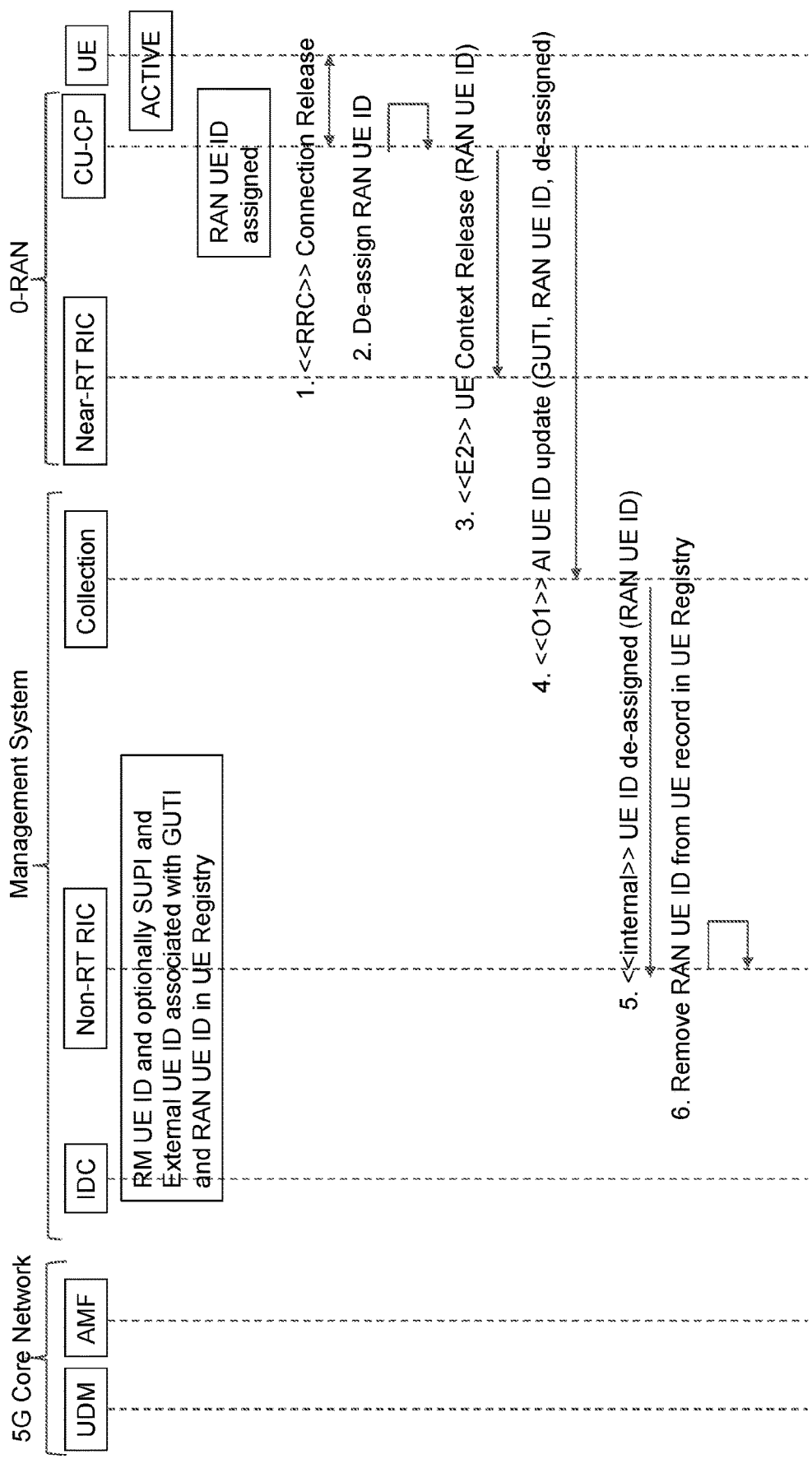
FIGS. 5A and 5B are a sequence diagram illustrating RAN UE ID de-assignment, according to some embodiments.
Figure 5B:
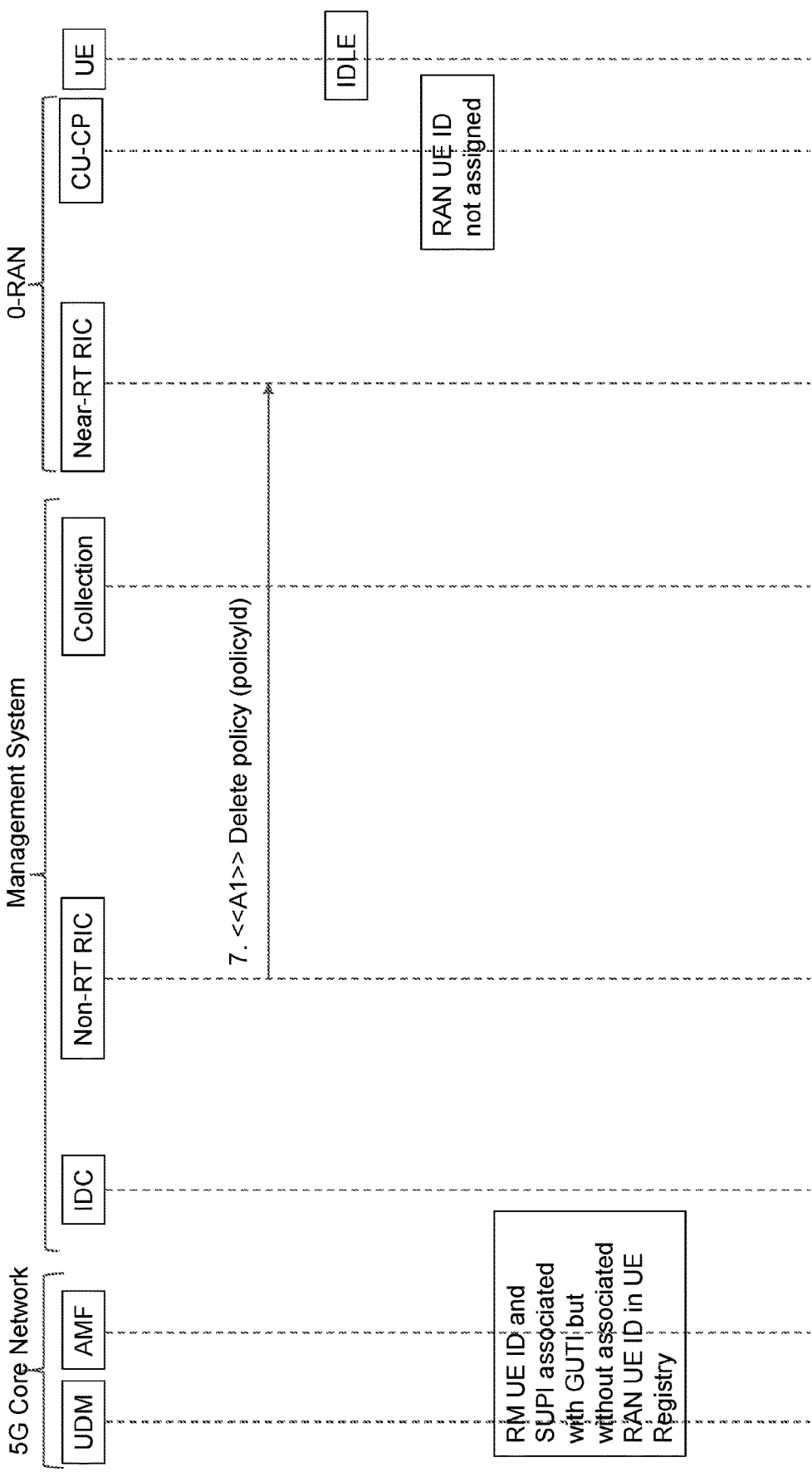

FIGS. 5A and 5B are a sequence diagram illustrating RAN UE ID de-assignment, according to some embodiments. The 5G core network includes a UDM and an AMF. The Management System includes an IDC, a non-RT RIC, and a Collection function (e.g., storage). The O-RAN includes a near-RT RIC and a CU-CP.

The UE starts out in the active state with a RAN UE ID assigned. The RM UE ID and SUPI associated with the GUTI and RAN UE ID are in the UE Registry.

At step 1, the UE sends an RRC Connection Release message to the CU-CP. The CU-CP de-assigns the RAN UE ID at step 2 and sends a UE Context Release message for the de-assigned RAN UE ID to the near-RT RIC over the E2 interface at step 3. The CU-CP also sends an A1 UEID update over the O1 interface to the Collection function at step 4. The update includes an indication that the RAN UE ID is no longer associated with the GUTI and has been de-assigned. At step 5, the Collection function sends an indication to the non-RT RIC that the RAN UE ID is de-assigned. At step 6, the non-RT RIC removes the RAN UE ID from the UE record in the UE Registry. At step 7, the non-RT RIC instructs the near-RT RIC to delete a policy over the A1 interface.

At this point the UE is IDLE the RAN UE ID is not assigned, and the RM UE ID and SUPI are associated with the GUTI but without the associated RAN UE ID in the UE Registry.

Figure 6A:
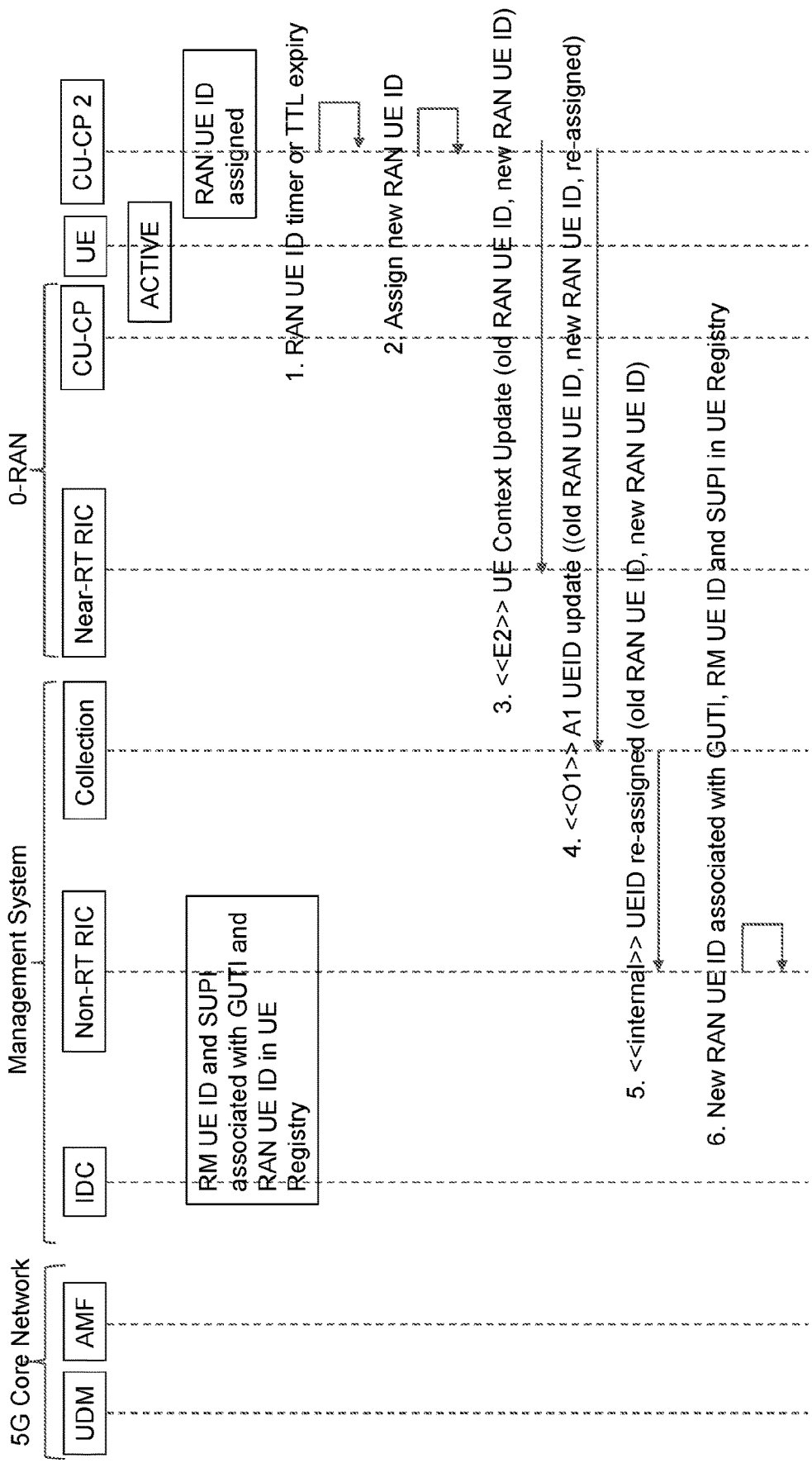
FIGS. 6A and 6B are a sequence diagram illustrating RAN UE ID re-assignment, according to some embodiments.
Figure 6B:
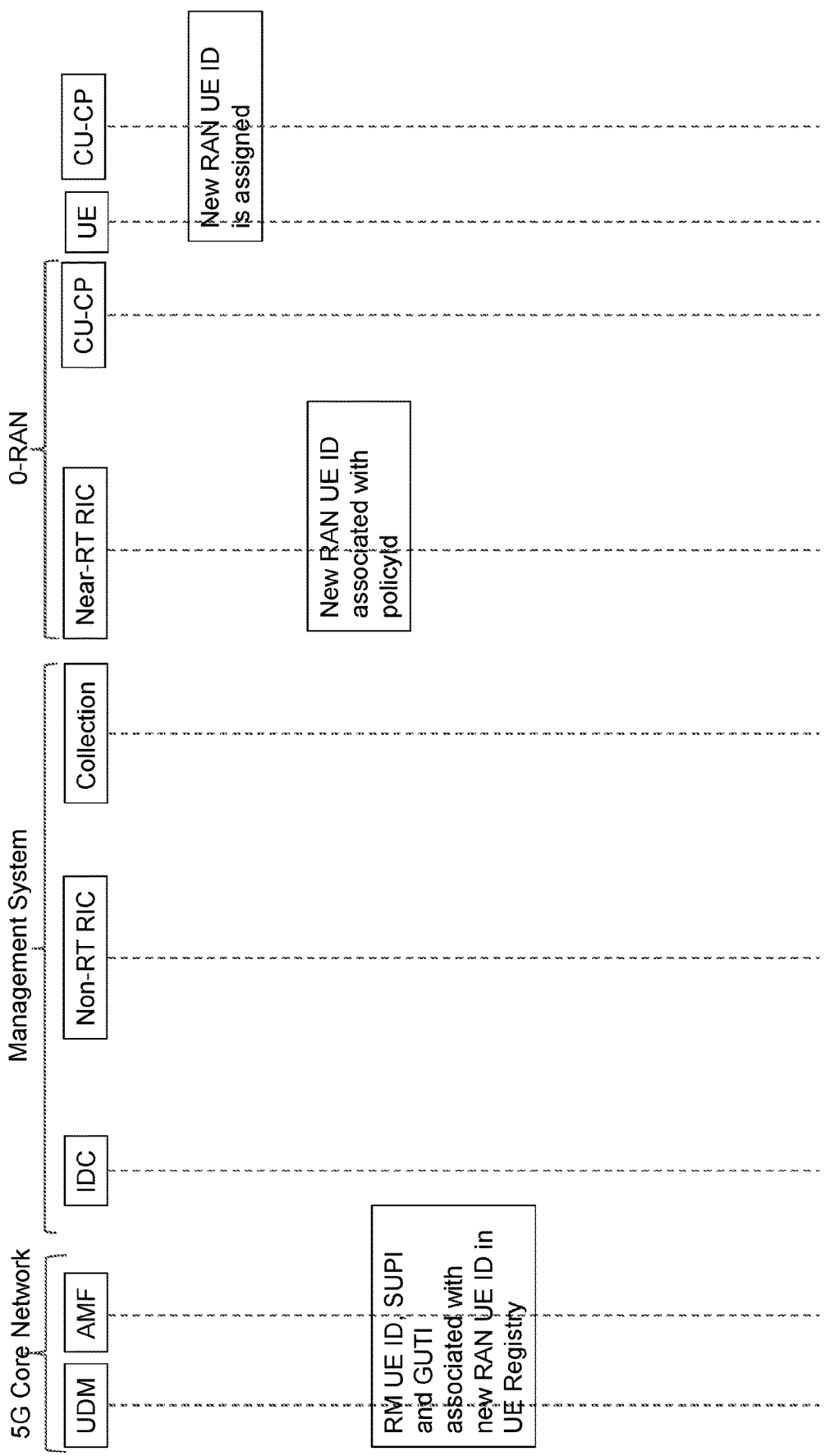

FIGS. 6A and 6B are a sequence diagram illustrating RAN UE ID re-assignment, according to some embodiments. The 5G core network includes a UDM and an AMF. The Management System includes an IDC, a non-RT RIC, and a Collection function (e.g., storage). The O-RAN includes a near-RT RIC and a CU-CP. A second CU-CP (CU-CP 2) is also in communication with the UE.

The UE is in the active state and a RM UE ID and SUPI are associated with the GUTI and current RAN UE ID for the UE in the UE registry. CU-CP 2 assigns a new RAN UE ID. At step 1, a RAN UE ID timer or TTL expiry occurs and CU-CP 2 assigns a new RAN UE ID at step 2. At step 3, CU-CP 2 sends a UE Context Update message to the near-RT RIC over the E2 interface. The message includes the old RAN UE ID and the new RAN UE ID. CU-CP 2 also sends an A1 UE ID update message to the Collection function over the O1 interface at step 4. The update includes the old RAN UE ID and the new RAN UE ID.

At step 5, the Collection function sends a UE ID reassigned message to the non-RT RIC. The non-RT RIC associates the new RAN UE ID with the GUTI, RM UE ID and SUPI in the UE Registry at step 6.

At this point the new RAN UE ID is assigned, a new RAN UE ID is associated with a policyId, and the RM UE ID, SUPI and GUTI are associated with the new RAN UE ID in the UE Registry.

Figure 7:
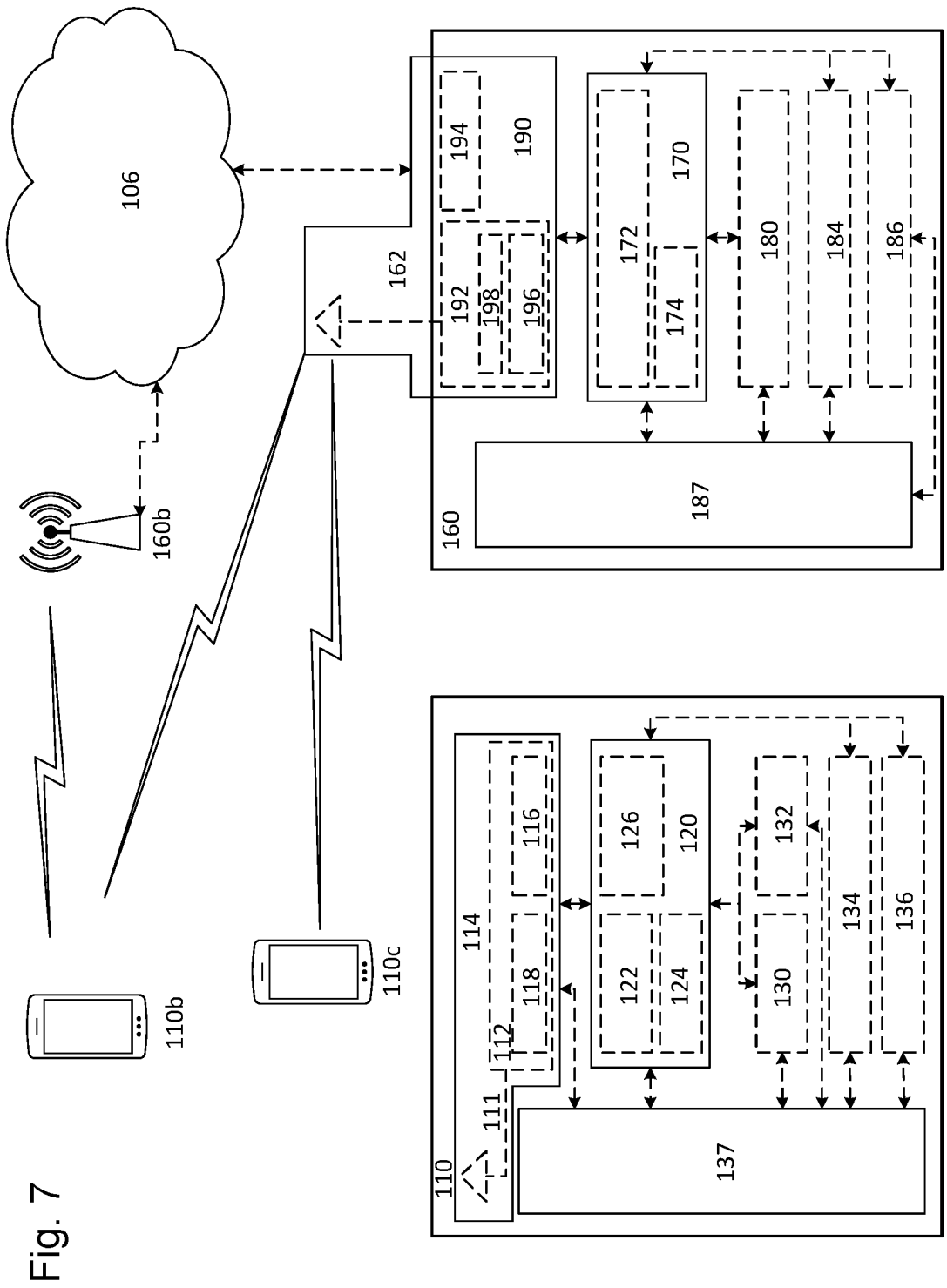
FIG. 7 is a block diagram illustrating an example wireless network.

FIG. 7 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), New Radio (NR), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 7, network node 160 includes processing circuitry 170, device readable medium 180, interface 190, auxiliary equipment 184, power source 186, power circuitry 187, and antenna 162. Although network node 160 illustrated in the example wireless network of FIG. 7 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB, gNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may, be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a batten or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 7 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaining console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.)

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may, condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or convened information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD)

or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 7. For simplicity, the wireless network of FIG. 7 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 8:
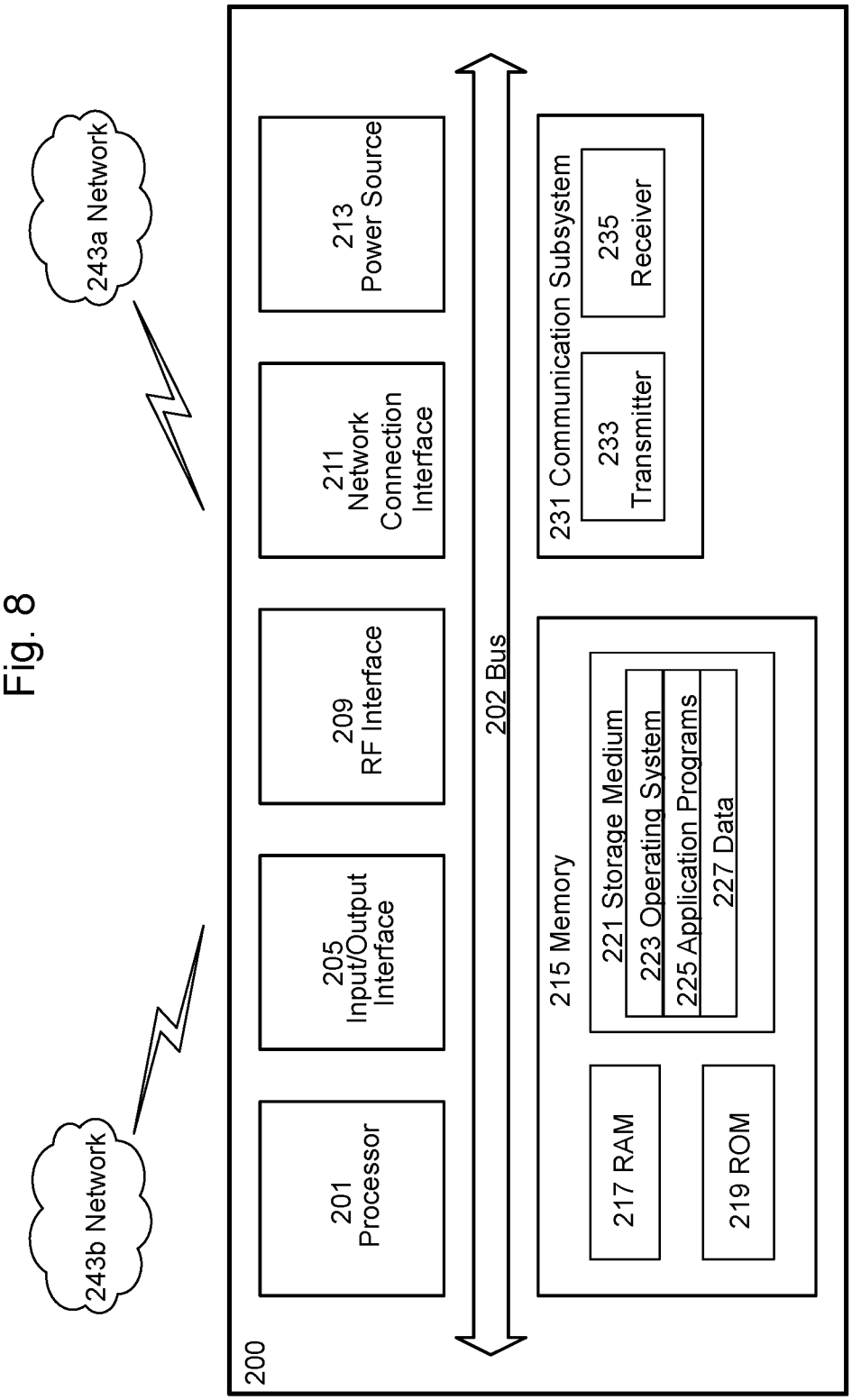
FIG. 8 illustrates an example user equipment, according to certain embodiments.

FIG. 8 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 8, is one example of a WD configured for communication in accordance with one or more communication standards promulgated by the $3^{rd}$ Generation Partnership Project (3GPP), such as 3GPP's GSM, UMTS, LTE, and/or NR standards. As mentioned previously, the term WD and UE may be used interchangeable. Accordingly, although FIG. 8 is a UE, the components discussed herein are equally applicable to a WD, and vice-versa.

FIG. 8. UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software: or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM. ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 8, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2. CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 9A:
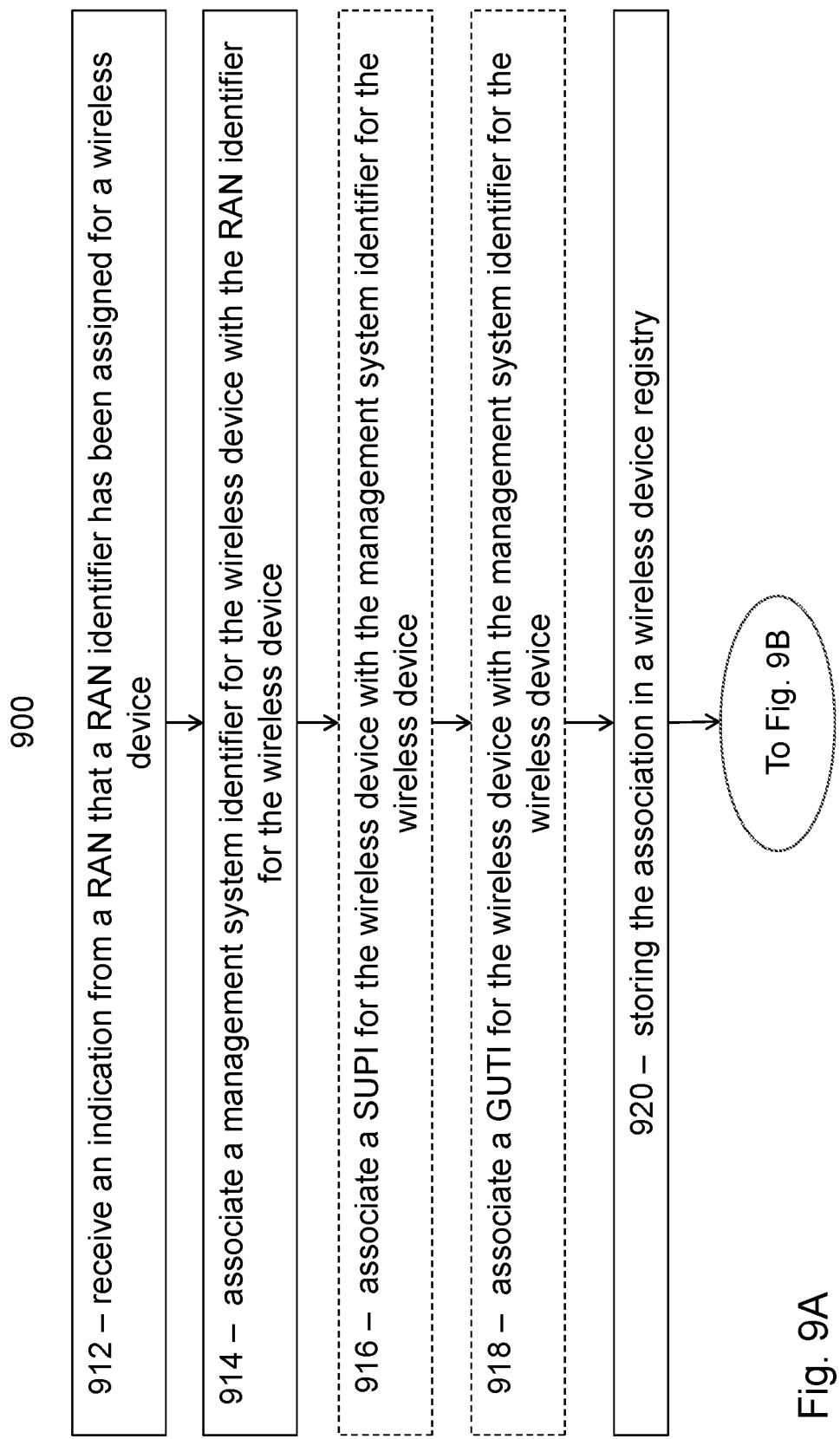

FIGS. 9A and 9B are a flowchart illustrating an example method in a network management system, according to certain embodiments. In particular embodiments, one or more steps of FIG. 9 may be performed by the management system described with respect to FIGS. 1-6.

Figure 4A:
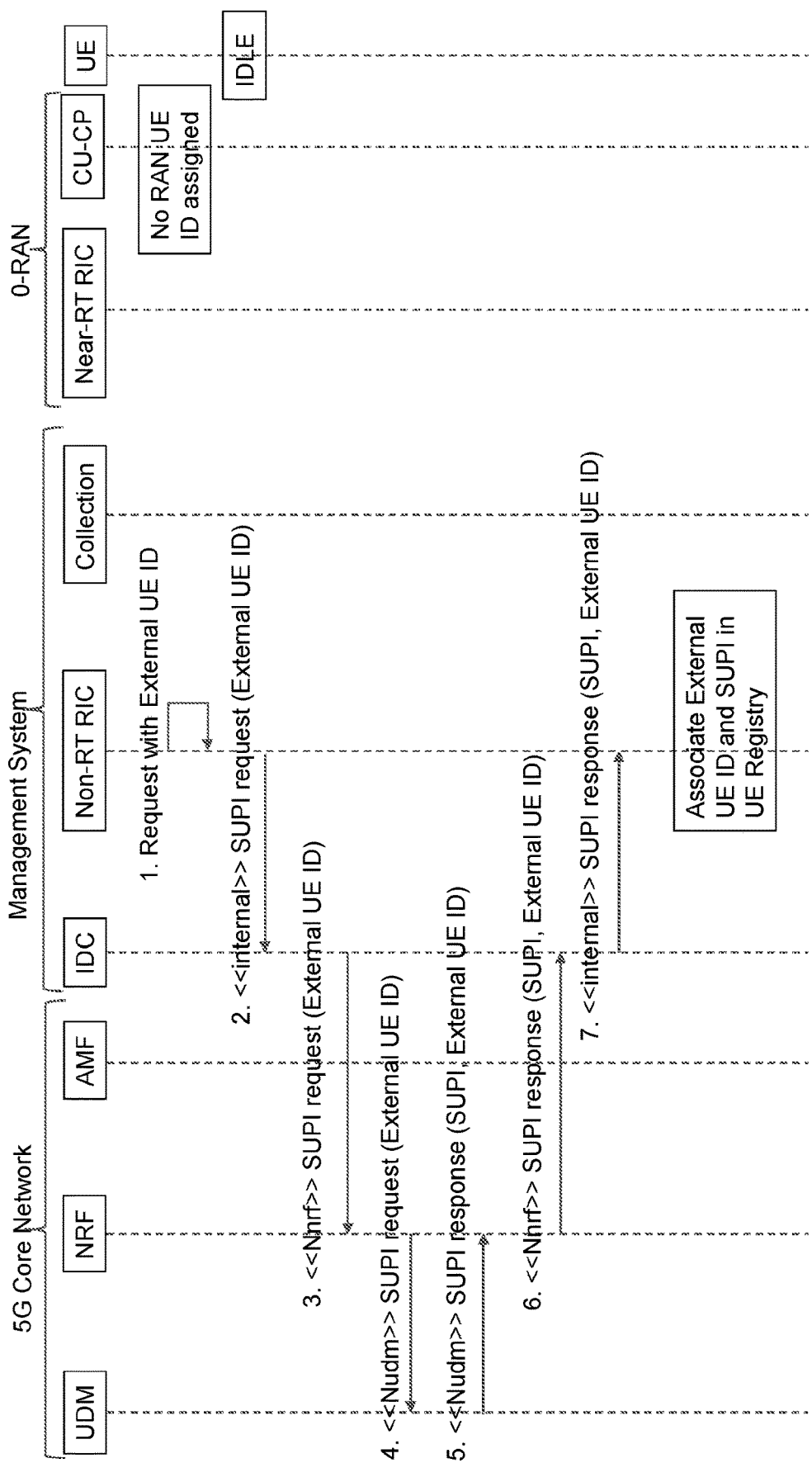
FIGS. 4A-4D are a sequence diagram illustrating RAN UE ID assignment and optional correlation with external UE ID and SUPI, according to some embodiments.
Figure 4B:
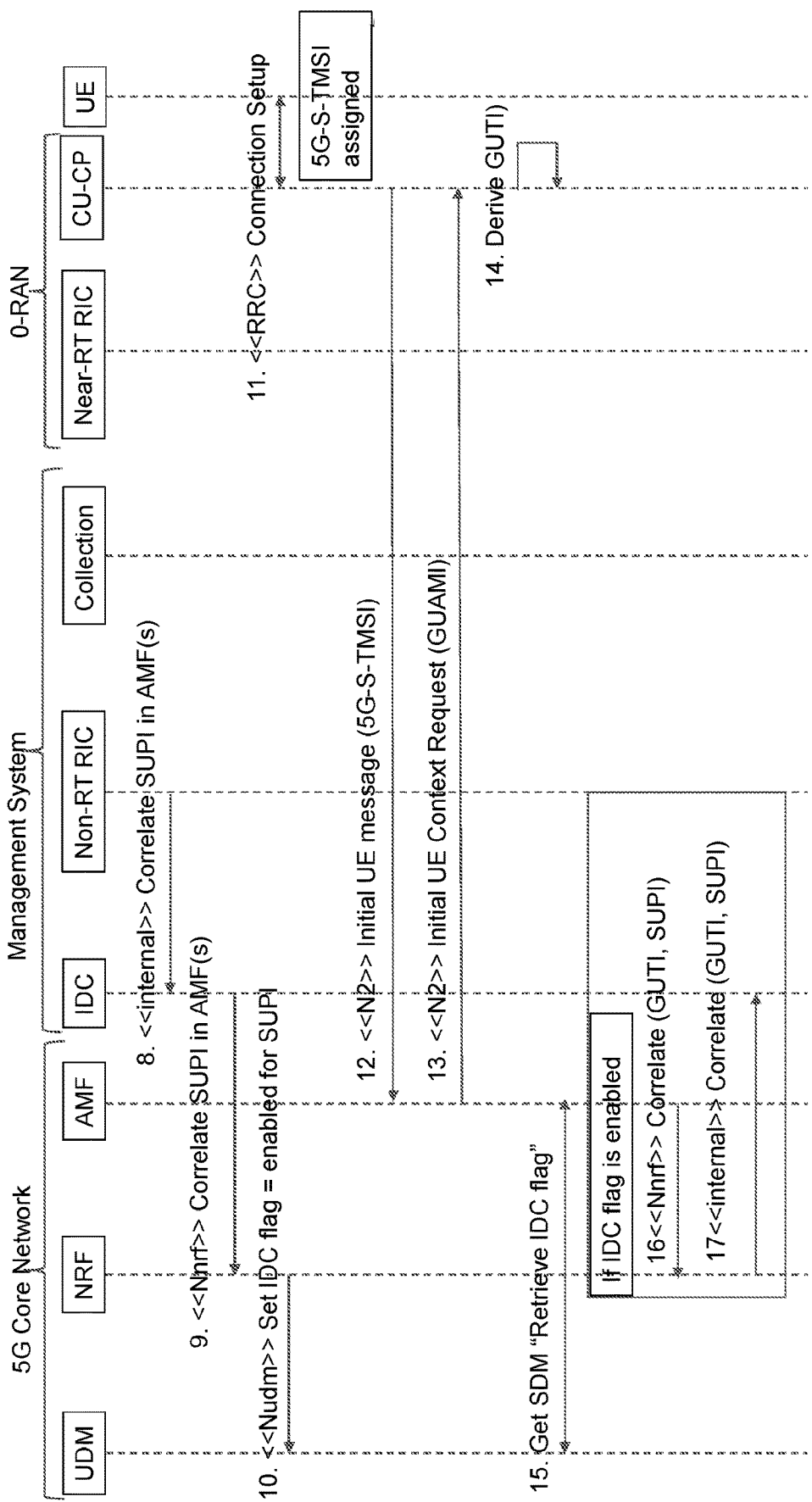
Figure 4C:
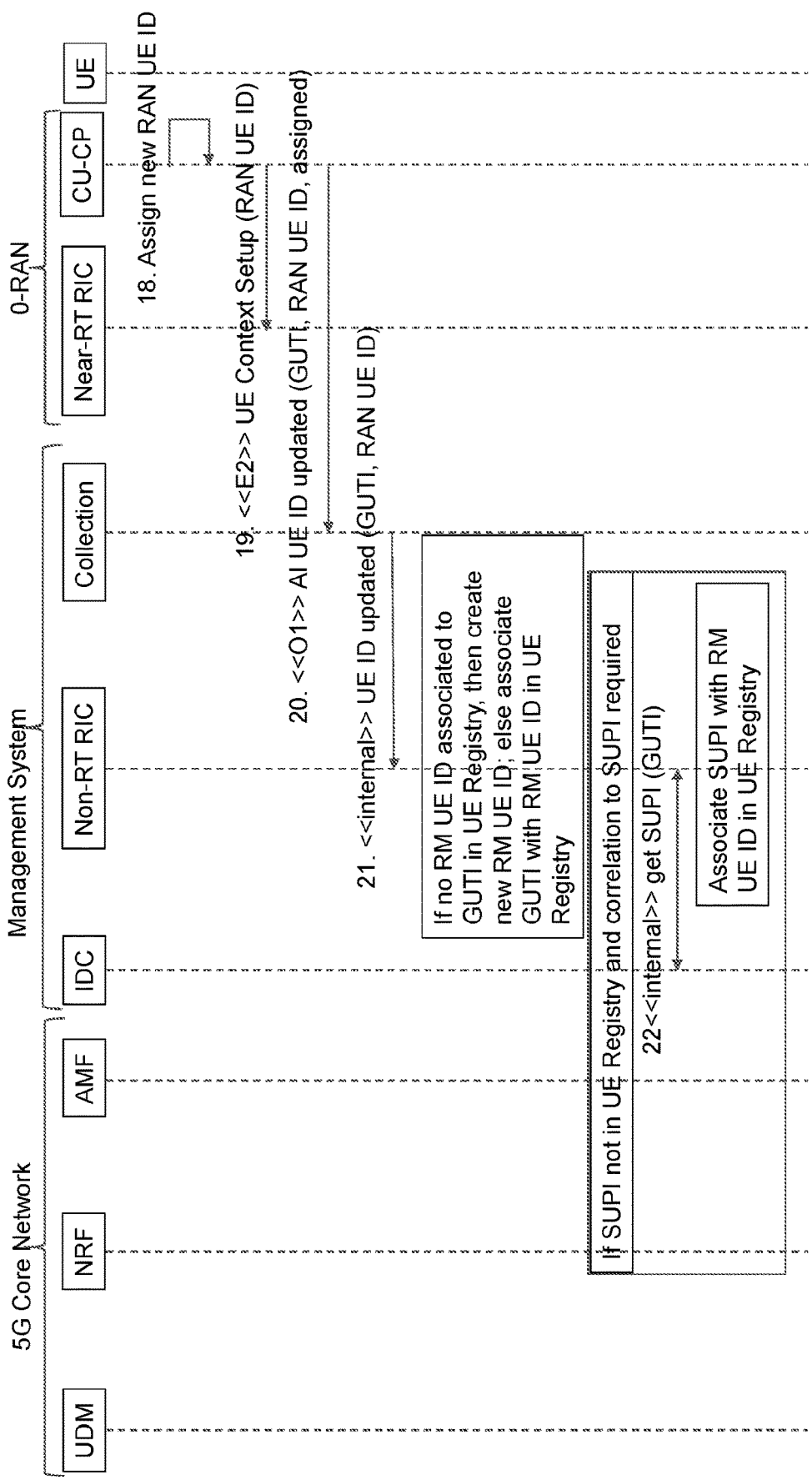
Figure 4D:
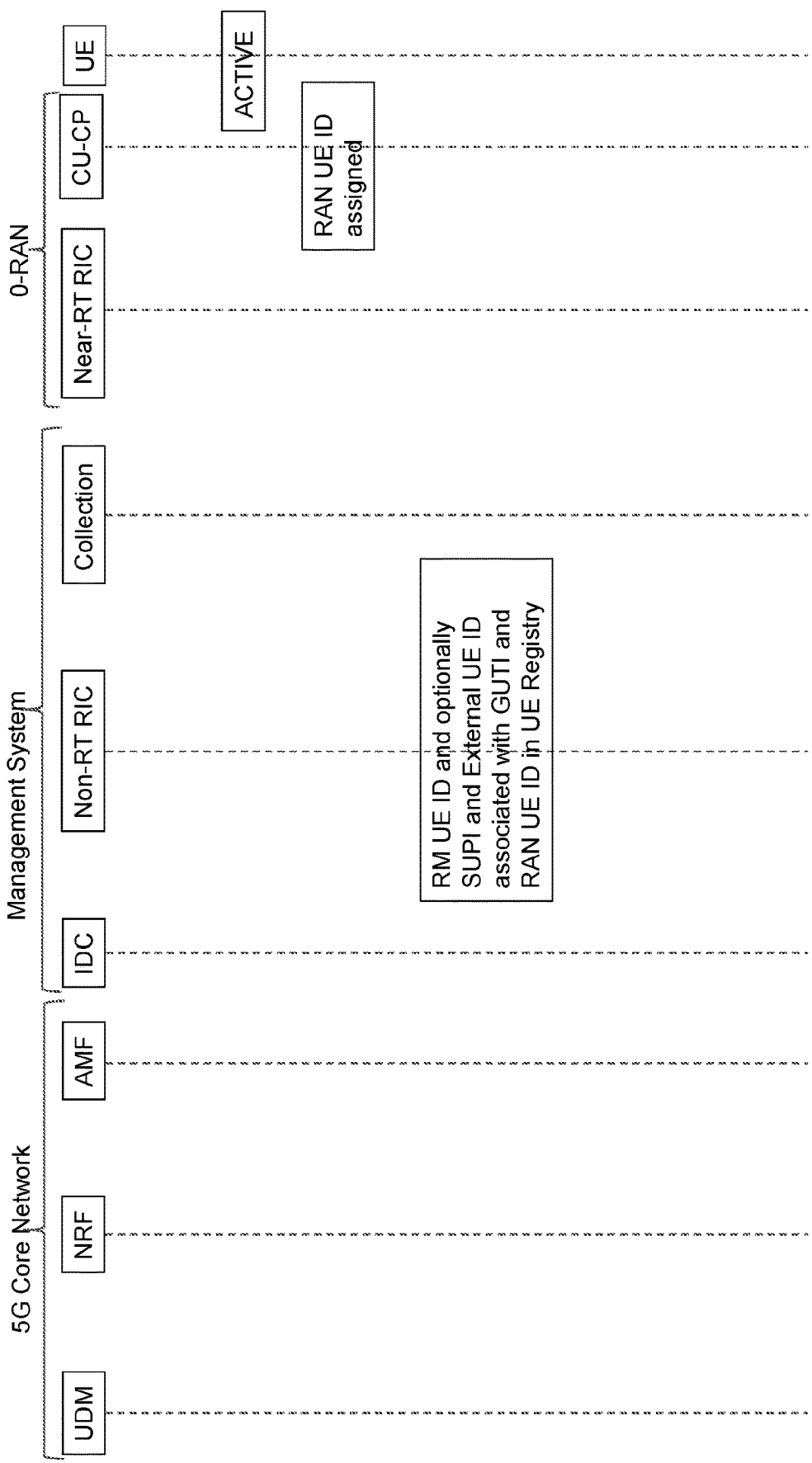

The method may begin at step 912, where the network management system receives an indication from a RAN that a RAN identifier has been assigned for a wireless device. For example, steps 11-20 described with respect to FIGS. 4B and 4C illustrate an example where a wireless device (e.g., UE) sends a RRC Connection Setup request that results in the assignment of a new RAN UE ID that is then sent to the network management system.

At step 914, the network management system associates a management system identifier for the wireless device with the RAN identifier for the wireless device. For example, steps 21 and 22 described with respect to FIG. 4C illustrate an example of updating the UE Registry (i.e., associating) a management system identifier (e.g., RM UE ID) with the RAN identifier (e.g., RAN UE ID) for the wireless device (e.g., UE).

At step 916, the network management system may associate a SUPI for the wireless device with the management system identifier for the wireless device. For example, step 22 described with respect to FIG. 4C illustrates an example of the network management system querying the IDC to get the SUPI to GUTI correlation. The network management system may store the correlation in the UE Registry entry for the wireless device (e.g., UE).

At step 918, the network management system may associate a GUTI for the wireless device with the management system identifier for the wireless device. For example, steps 11-20 described with respect to FIGS. 4B and 4C illustrate a GUTI associated with the RAN UE ID that is sent to the network management system. The network management system may store the GUTI to RAN UE ID correlation in the UE Registry entry for the wireless device (e.g., UE).

At step 920, the network management system may store the association in a wireless device registry. For example, steps 11-20 described with respect to FIGS. 4B and 4C illustrate the network management system storing one or more of a GUTI, SUPI, and RM UE ID associated with the RAN UE ID in the UE Registry entry for the wireless device (e.g., UE).

After the initial correlations have been stored, during normal network operation the RAN identifier associated with a wireless device may change (e.g., based on a timer expiry or TTL expiry). The wireless device may be assigned a new RAN identifier.

At step 922, the network management system receives an indication from a RAN that a RAN identifier has been reassigned for a wireless device. For example, steps 1-4 described with respect to FIG. 6A illustrate the network management system receiving an indication from a RAN that a RAN identifier (e.g., RAN UE ID) has been reassigned for a wireless device (e.g., UE).

At step 924, the network management system updates the association of the management system identifier for the wireless device with the reassigned RAN identifier for the wireless device. For example, steps 5 and 6 described with respect to FIG. 6A illustrate the network management system updating the association of the management system identifier (e.g., RM UE ID) for the wireless device with the reassigned RAN identifier (e.g., new RAN UE 10) for the wireless device (e.g., UE).

At some time during normal operation the wireless device may return to the IDLE state and its RAN identifier may be de-assigned.

At step 926, the network management system receives an indication from the RAN that a RAN identifier has been de-assigned for a wireless device. For example, steps 1-4 described with respect to FIG. 5A illustrate the network management system receiving an indication from a RAN that a RAN identifier (e.g., RAN UE ID) has been de-assigned for a wireless device (e.g., UE).

At step 928, the network management system removes an association of a management system identifier for the wireless device with the de-assigned RAN identifier for the wireless device from the registry. For example, steps 5 and 6 described with respect to FIG. 6A illustrate the network management system removing an association of a management system identifier (e.g., RM UE ID) for the wireless device (e.g., UE) with the de-assigned RAN identifier (e.g., RAN UE ID) for the wireless device from the registry (e.g., UE Registry).

As described above, one purpose of maintaining the association between the management system identifier for the wireless device and RAN identifier for the wireless device is so that the network management system can address, monitor, and/or configure individual wireless devices in the network.

At step 930, the network management system may determine to perform an operation for the wireless device towards the RAN. For example, the network management system may want to enable to disable particular measurement gathering for the wireless device.

At step 932, the network management system correlates the network management identifier associated with the wireless device with the RAN identifier for the wireless device based on the registry. For example, the network management system may identify wireless devices based on a network management identifier, but the RAN does not have knowledge of the network management identifier. The network management system may look up the RAN identifier associated with the network management identifier so that the RAN identifier may be used in communications with the RAN.

At step 934, the network management system transmits a message towards the RAN that includes the RAN identifier for the wireless device. For example, the network management system may transmit a message to enable or disable measurement gathering for the RAN identifier.

Modifications, additions, or omissions may be made to method 900 of FIG. 9. Additionally, one or more steps in the method of FIG. 9 may be performed in parallel or in any suitable order. For example, many times step 918 may be performed before step 916. As another example, the network management system may perform step 920 after step 914 then perform one or more of steps 916 and 918 at a later time. Although particular steps were described with respect to steps illustrated in FIGS. 4A-6B, additional detail for each of the steps is also described with respect to FIGS. 1-3.

Figure 10:
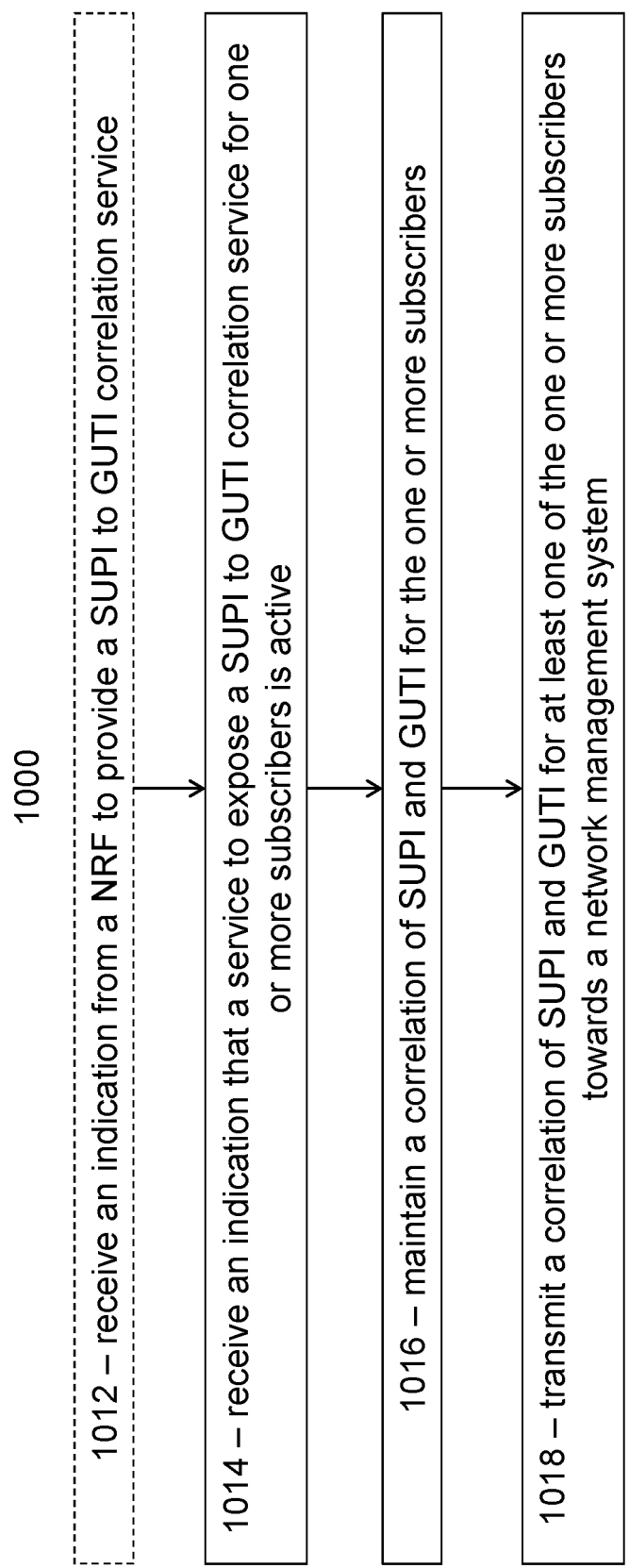
FIG. 10 is a flowchart illustrating an example method in an access and mobility management function (AMF), according to certain embodiments.

FIG. 10 is a flowchart illustrating an example method in an AMF, according to certain embodiments. In particular embodiments, one or more steps of FIG. 10 may be performed by the AMF described with respect to FIGS. 1-6.

The method may begin at step 1012, where the AMF receive an indication from a NRF to provide a SUPI to GUTI correlation service. An example is described with respect to FIG. 2.

At step 1014, the AMF receives an indication that a service to expose a SUPI to GUTI correlation service for one or more subscribers is active. An example is described with respect to FIG. 2. At step 1016, the AMF maintain (e.g., stores) a correlation of SUPI and GUTI for the one or more subscribers. At step 1018, the AMF transmits a correlation of SUPI and GUTI for at least one of the one or more subscribers towards a network management system. For example, the network management system may know a GUTI associated with a wireless device but not the SUPI. The network management system contacts the AMF to get the SUPI associated with the GUTI.

Modifications, additions, or omissions may be made to method 1000 of FIG. 10. Additionally, one or more steps in the method of FIG. 10 may be performed in parallel or in any suitable order. Although particular steps were described with respect to steps illustrated in FIG. 2, additional detail for each of the steps is also described with respect to FIGS. 1 and 4A-6B.

Figure 11:
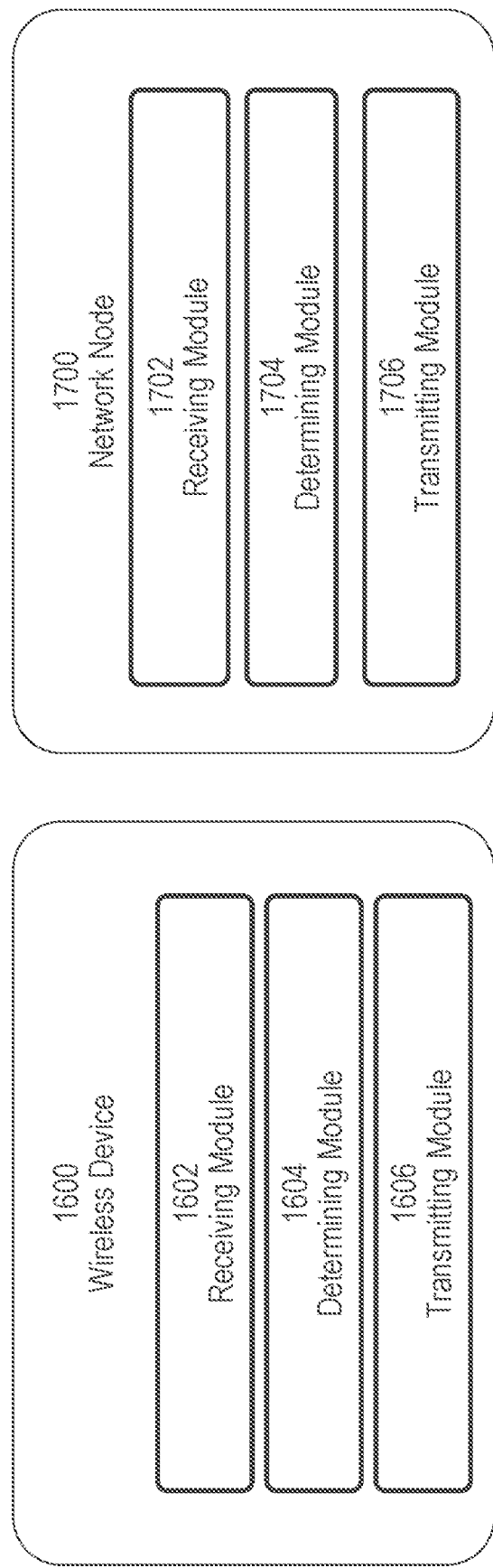
FIG. 11 illustrates a schematic block diagram of a wireless device and network node in a wireless network, according to certain embodiments.

FIG. 11 illustrates a schematic block diagram of two apparatuses in a wireless network (for example, the wireless network illustrated in FIG. 7). The apparatuses include a wireless device and a network node (e.g., wireless device 110 and network node 160 illustrated in FIG. 7). Apparatuses 1600 and 1700 are operable to carry out the example methods described with reference to FIGS. 9 and 10, respectively, and possibly any other processes or methods disclosed herein. It is also to be understood that the methods of FIGS. 9 and 10 are not necessarily carried out solely by apparatus 1600 and/or apparatus 1700. At least some operations of the method can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, transmitting module 1606, and any other suitable units of apparatus 1600 to perform corresponding functions according one or more embodiments of the present disclosure. Similarly, the processing circuitry described above may be used to cause receiving module 1702, determining module 1704, transmitting module 1706, and any other suitable units of apparatus 1700 to perform corresponding functions according one or more embodiments of the present disclosure.

As illustrated in FIG. 11, apparatus 1600 includes receiving module 1602 configured to receive transmissions on a particular RAT, according to any of the embodiments and examples described herein. Transmitting module 1606 is configured to transmit transmissions on a particular RAT, according to any of the embodiments and examples described herein. The RAT may overlap with another RAT according to any of the embodiments and examples described herein.

As illustrated in FIG. 11, apparatus 1700 includes receiving module 1702 configured to receive transmissions on a particular RAT or RATs, according to any of the embodiments and examples described herein. Transmitting module 1706 is configured to transmit transmissions on a particular RAT or RATs, according to any of the embodiments and examples described herein. The RATs may overlap according to any of the embodiments and examples described herein.

Figure 12:
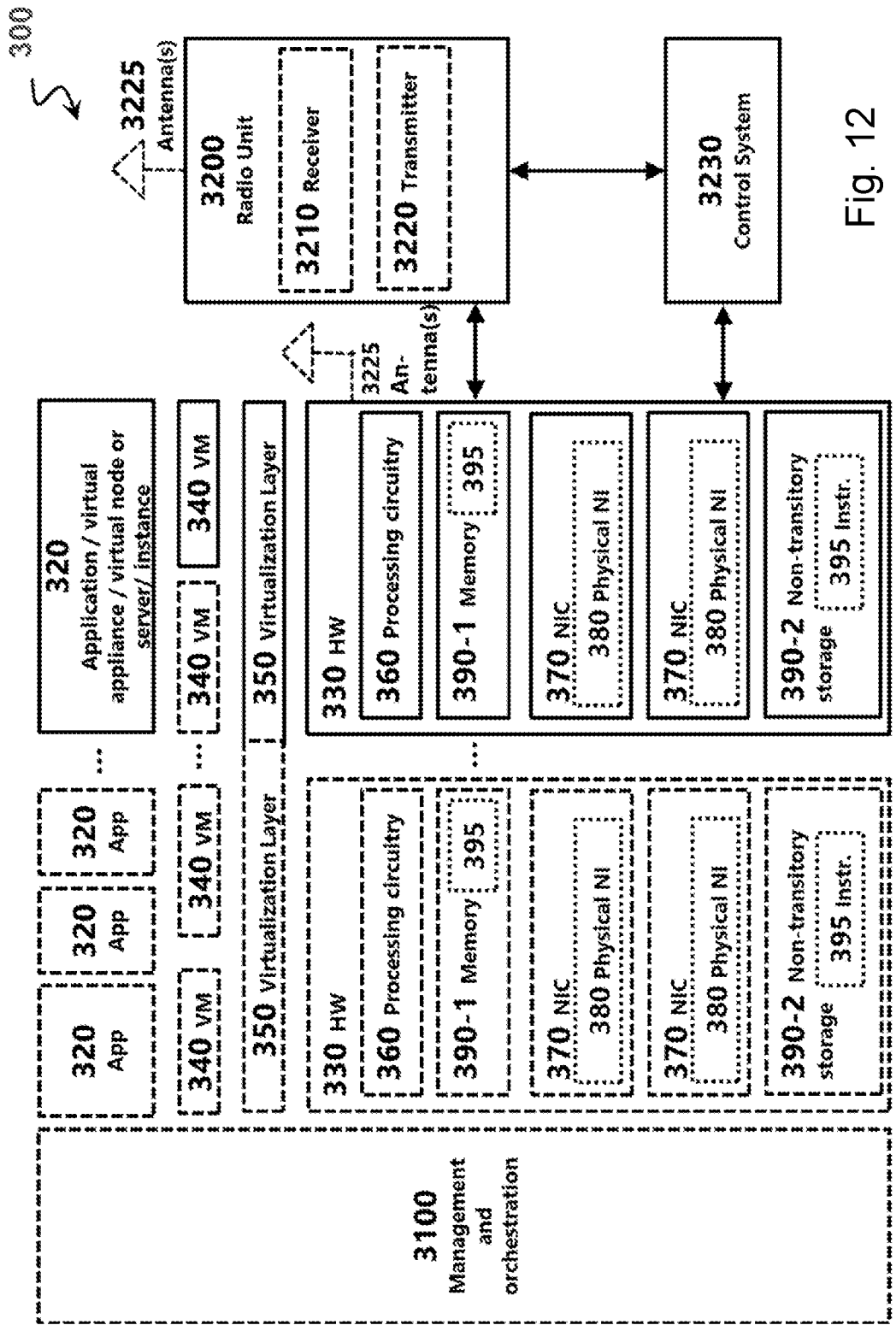
FIG. 12 illustrates an example virtualization environment, according to certain embodiments.

FIG. 12 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may, be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 12, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 13:
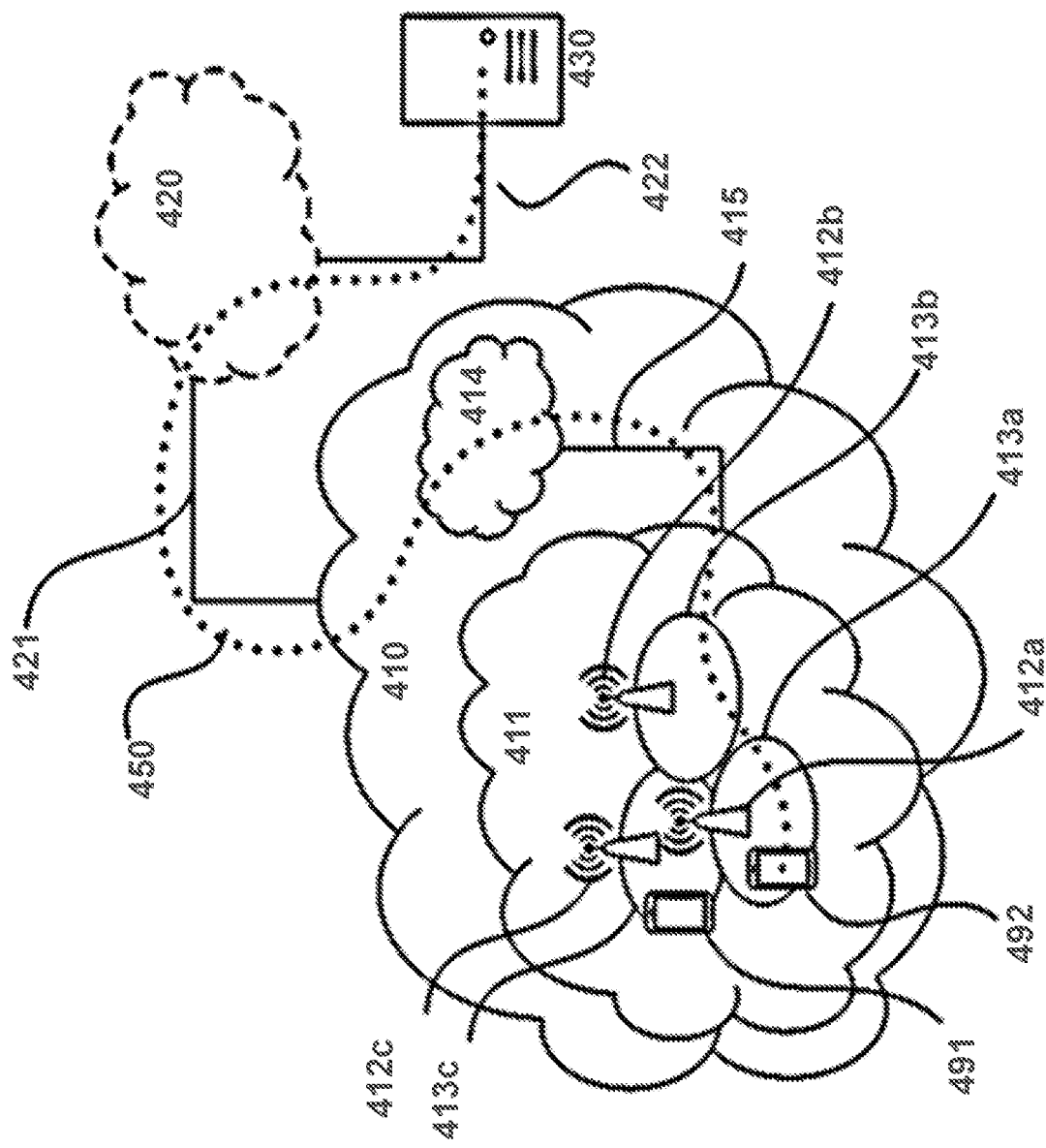
FIG. 13 illustrates an example telecommunication network connected via an intermediate network to a host computer, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 13.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

With reference to FIG. 13, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a fired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet, in particular, intermediate network 420 may comprise two or more sub-networks (not shown).

The communication system of FIG. 13 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 14:
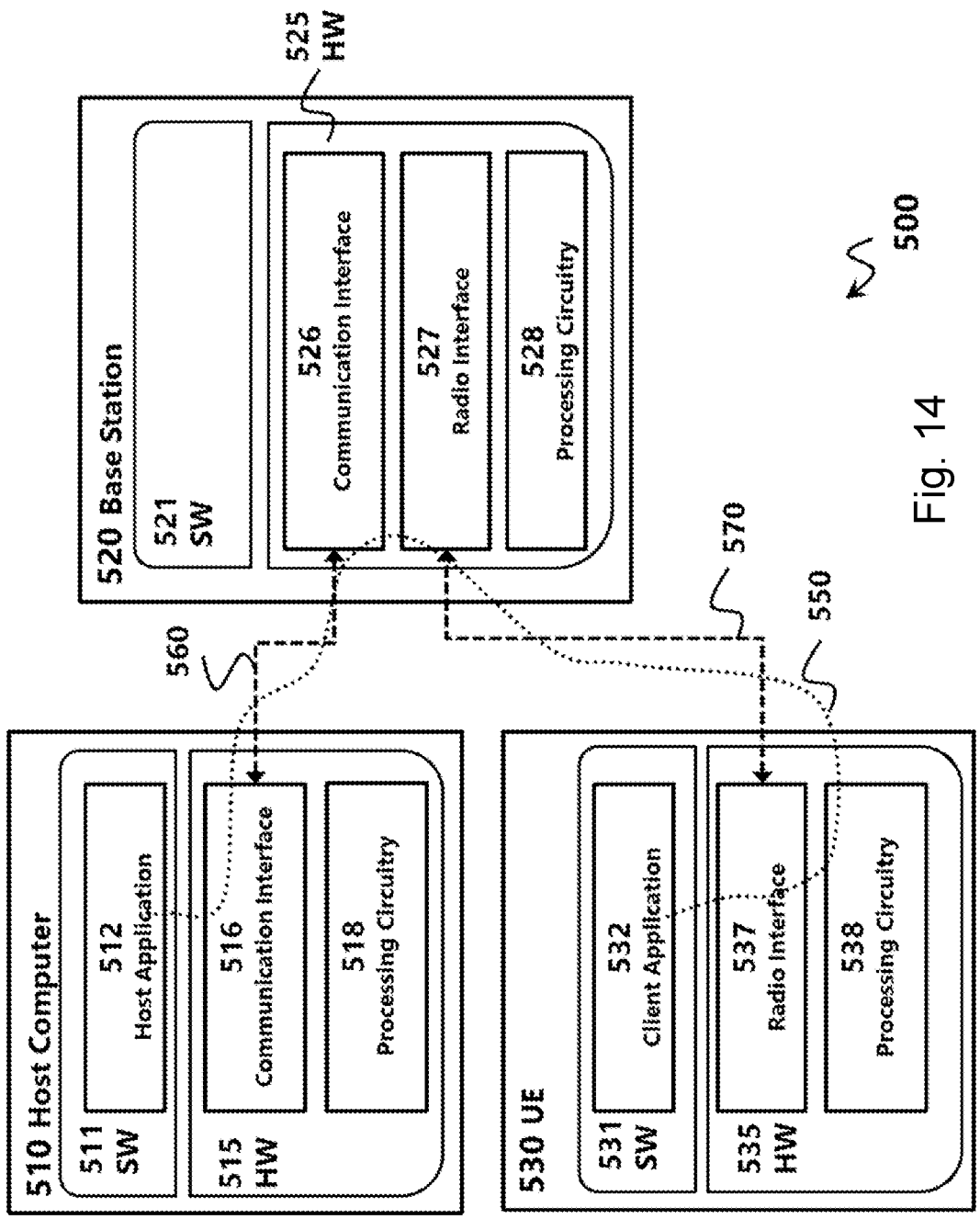
FIG. 14 illustrates an example host computer communicating via a base station with a user equipment over a partially wireless connection, according to certain embodiments.

FIG. 14 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 14. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 14) served by base station 520. Communication interface 526 may be configured to facilitate connection 560 to host computer 510. Connection 560 may be direct, or it may pass through a core network (not shown in FIG. 14) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 14 may be similar or identical to host computer 430, one of base stations 412a, 412b, 412c and one of UEs 491, 492 of FIG. 13, respectively. This is to say, the inner workings of these entities may be as shown in FIG. 14 and independently, the surrounding network topology may be that of FIG. 13.

In FIG. 14, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, and thereby provide benefits such as reduced user waiting time, better responsiveness and extended batters life.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 15:
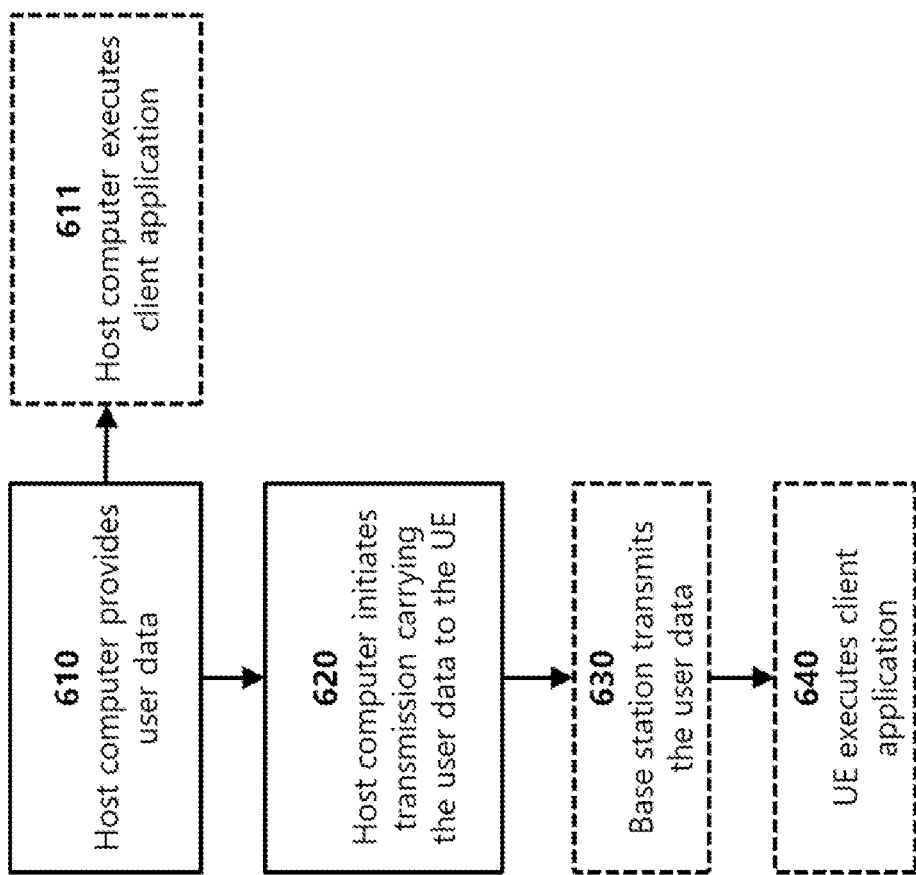
FIG. 15 is a flowchart illustrating a method implemented, according to certain embodiments.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 16:
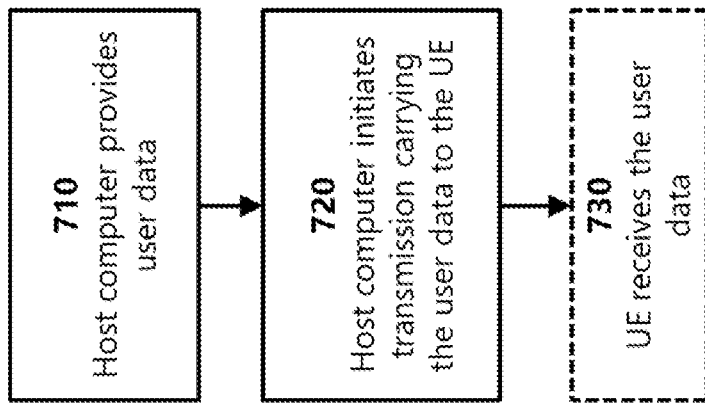
FIG. 16 is a flowchart illustrating a method implemented in a communication system, according to certain embodiments.

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 17:
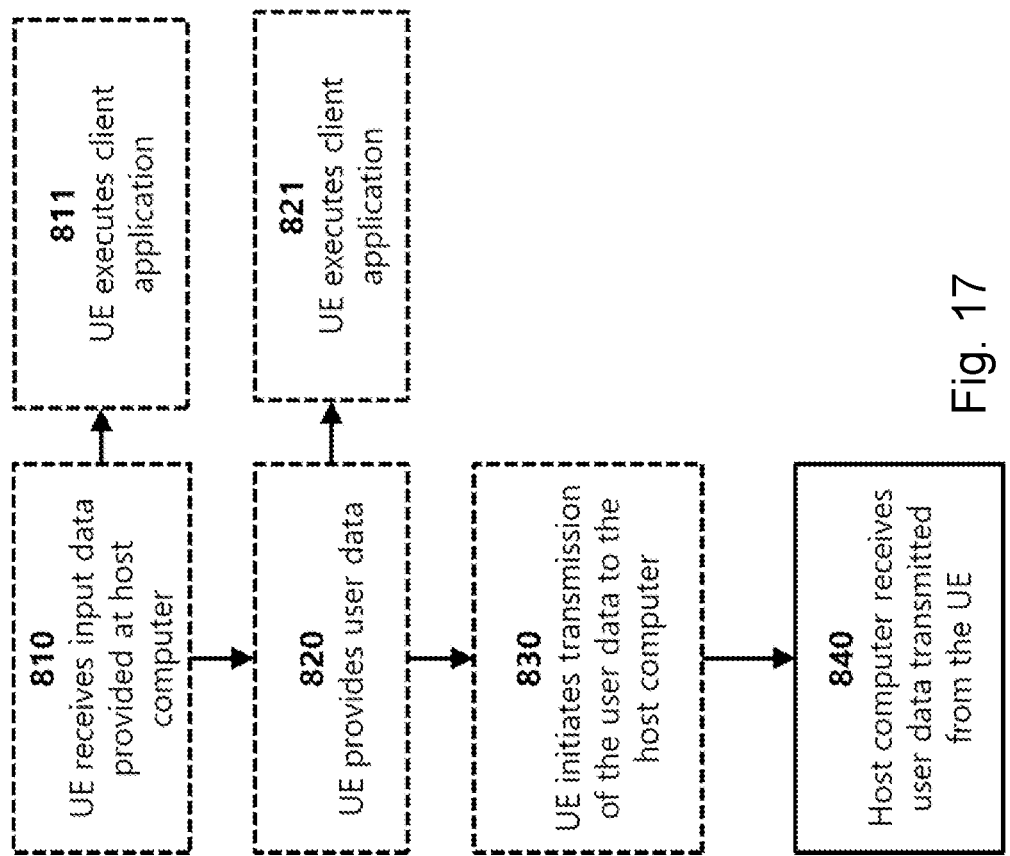
FIG. 17 is a flowchart illustrating a method implemented in a communication system, according to certain embodiments.

FIG. 17 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 17 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application hi substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 18:
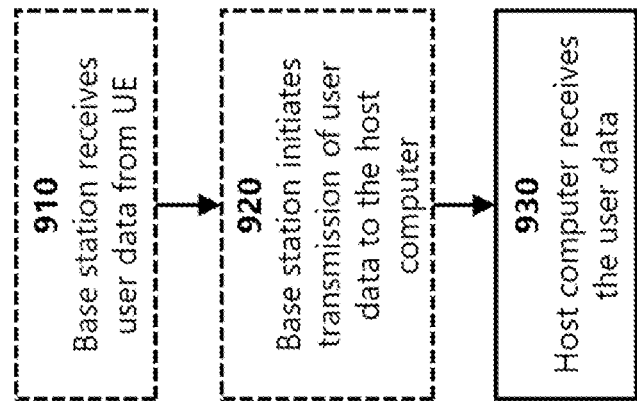
FIG. 18 is a flowchart illustrating a method implemented in a communication system, according to certain embodiments.

FIG. 18 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 18 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses (nay be performed by more, fewer, or other components. Additionally, operations of the systems and apparatuses may be performed using any suitable logic comprising software, hardware, and/or other logic. As used in this document. "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may, be practiced without these specific details. In other instances, well-known circuits, structures and techniques have not been shown in detail in order not to obscure the understanding of this description. Those of ordinary skill in the art, with the included descriptions, will be able to implement appropriate functionality, without undue experimentation.

References in the specification to "one embodiment," "an embodiment," an example embodiment," etc., indicate that the embodiment described may include a particular feature, structure, or characteristic, but every embodiment may not necessarily include the particular feature, structure, or characteristic. Moreover such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SOW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide COMA
WLAN Wide Local Area Network

The invention claimed is:

1. A method performed by a network management system for managing one or more radio access networks (RANs), the method comprising:
  receiving an indication from a RAN that a RAN identifier has been assigned for a wireless device;
  when no management system identifier for the wireless device is associated with the RAN identifier for the wireless device, creating a management system identifier for the wireless device;
  creating an association of the management system identifier for the wireless device with the RAN identifier for the wireless device; and
  storing the association in a wireless device registry.

2. The method of claim 1, further comprising associating a subscription permanent identifier (SUPI) for the wireless device with the management system identifier for the wireless device.

3. The method of claim 1, further comprising associating a global unique temporary identifier (GUTI) for the wireless device with the management system identifier for the wireless device.

4. The method of claim 1, further comprising:
receiving an indication that the RAN identifier has been reassigned for the wireless device; and
updating the association of the management system identifier for the wireless device with a new RAN identifier for the wireless device.

5. The method of claim 1, further comprising:
receiving an indication from the RAN that the RAN identifier has been de-assigned for a wireless device; and
removing the association of the management system identifier for the wireless device with the de-assigned RAN identifier for the wireless device from the registry.

6. The method of claim 1, further comprising:
determining to perform an operation for the wireless device towards the RAN;
correlating the network management identifier associated with the wireless device with the RAN identifier for the wireless device based on the registry; and
transmitting a message towards the RAN that includes the RAN identifier for the wireless device.

7. The method of claim 1, further comprising requesting an identifier correlation from an identifier correlation (IDC) service.

8. The method of claim 7, wherein the IDC service comprises a subscription permanent identifier (SUPI) to global unique temporary identifier (GUTI) correlation service.

9. A network management system operable to manage one or more radio access networks (RANs), the network management system comprising processing circuitry operable to:
receive an indication from a RAN that a RAN identifier has been assigned for a wireless device;
when no management system identifier for the wireless device is associated with the RAN identifier for the wireless device, create a management system identifier for the wireless device;
a create an association of the management system identifier for the wireless device with the RAN identifier for the wireless device; and
store the association in a wireless device registry.

10. The network management system of claim 9, the processing circuitry further operable to associate a subscription permanent identifier (SUPI) for the wireless device with the management system identifier for the wireless device.

11. The network management system of claim 9, the processing circuitry further operable to associate a global unique temporary identifier (GUTI) for the wireless device with the management system identifier for the wireless device.

12. The network management system of claim 9, the processing circuitry further operable to:
receive an indication that the RAN identifier has been reassigned for the wireless device; and
update the association of the management system identifier for the wireless device with a new RAN identifier for the wireless device.

13. The network management system of claim 9, the processing circuitry further operable to:
receive an indication from the RAN that the RAN identifier has been de-assigned for the wireless device; and
remove the association of the management system identifier for the wireless device with the de-assigned RAN identifier for the wireless device from the registry.

14. The network management system of claim 9, the processing circuitry further operable to:
determine to perform an operation for the wireless device towards the RAN;
correlate the network management identifier associated with the wireless device with the RAN identifier for the wireless device based on the registry; and
transmit a message towards the RAN that includes the RAN identifier for the wireless device.

15. The network management system of claim 9, the processing circuitry further operable to request an identifier correlation from an identifier correlation (IDC) service.

16. The network management system of claim 15, wherein the IDC service comprises a subscription permanent identifier (SUPI) to global unique temporary identifier (GUTI) correlation service.

17. A method performed by an access and mobility management function (AMF), the method comprising:
receiving an indication that a service to expose a subscription permanent identifier (SUPI) to global unique temporary identifier (GUTI) correlation service for one or more subscribers is active;
maintaining a correlation of SUPI and GUTI for the one or more subscribers; and
transmitting a correlation of SUPI and GUTI for at least one of the one or more subscribers towards a network management system.

18. The method of claim 17, further comprising receiving an indication from a network registration function (NRF) to provide the SUPI to GUTI correlation service.

19. The method of claim 17, wherein transmitting the correlation of SUPI and GUTI for at least one of the one or more subscribers comprises transmitting the correlation to a network registration function (NRF).

20. An access and mobility management function (AMF) device comprising processing circuitry operable to:
receive an indication that a service to expose a subscription permanent identifier (SUPI) to global unique temporary identifier (GUTI) correlation service for one or more subscribers is active;
maintain a correlation of SUPI and GUTI for the one or more subscribers; and
transmit a correlation of SUPI and GUTI for at least one of the one or more subscribers towards a network management system.

21. The AMF device of claim 20, the processing circuitry further operable to receive an indication from a network registration function (NRF) to provide the SUPI to GUTI correlation service.

22. The AMF device of claim 20, wherein the processing circuitry is operable to transmit the correlation of SUPI and GUTI for at least one of the one or more subscribers by transmitting the correlation to a network registration function (NRF).

* * * * *